US008004491B2

(12) United States Patent
Maynard et al.

(10) Patent No.: US 8,004,491 B2
(45) Date of Patent: Aug. 23, 2011

(54) SYSTEM FOR AND METHODS OF STORING AND COMPARING COMPUTER GENERATED CONTINUOUS VECTOR LINES THROUGH A NON-SECURE OR A SECURE COMMUNICATION CHANNEL

(76) Inventors: Jeff Maynard, Highland Village, TX (US); Son Nguyen, Lewisville, TX (US)

( * ) Notice: Subject to any disclaimer, the term of this patent is extended or adjusted under 35 U.S.C. 154(b) by 1168 days.

(21) Appl. No.: 11/734,149

(22) Filed: Apr. 11, 2007

(65) Prior Publication Data

US 2007/0236453 A1 Oct. 11, 2007

Related U.S. Application Data

(63) Continuation of application No. 10/957,581, filed on Oct. 5, 2004, now Pat. No. 7,663,614.

(51) Int. Cl.
*G09G 5/00* (2006.01)
(52) U.S. Cl. ........................ 345/156; 345/158
(58) Field of Classification Search ........... 345/156–173
See application file for complete search history.

(56) References Cited

U.S. PATENT DOCUMENTS

| | | | | |
|---|---|---|---|---|
| 5,194,969 | A * | 3/1993 | DiFrancesco | 358/463 |
| 5,801,681 | A * | 9/1998 | Sayag | 345/157 |
| 6,933,930 | B2 * | 8/2005 | Devige et al. | 345/173 |
| 2003/0003463 | A1 * | 1/2003 | Rothberg et al. | 435/6 |
| 2005/0021282 | A1 * | 1/2005 | Sammut et al. | 702/150 |

* cited by examiner

*Primary Examiner* — Amare Mengistu
*Assistant Examiner* — Jennifer Zubajlo
(74) *Attorney, Agent, or Firm* — Wilson Daniel Swayze, Jr.

(57) ABSTRACT

A system/method to store and compare computer generated vector lines through an insecure or a secure communication channel. Using an input device (i.e. computer Keyboard, finger, soft keypad, or any other input from body movements, electrical current, or impulses, or input from human or mechanical sound waves) to a physical machine, or through a token (i.e. credit card, USB token, which can be carried around by user), a user enters and sends their unique identifier and reference code (i.e. PIN, password, other secret code) to the physical machine by making a contact or contact-less to the computer system. As part of the enrollment process the user inscribes a pre-determined set of continuous vector lines (CVLs). The CVLs include data points that are collected from any computer pointing device in a specific format, using a push down anatomical technique and are sent to local active content (i.e. a library, or a program, or an add-on to the internet browser i.e. ActiveX) or a remote server for further analysis of the two CVLs. A user should go through an Enrollment and Verification process to capture the data points and this process uses a two factor authentication and a verification scheme. The collected data points that represent a CVL profile made previously is kept in a database, registry, or memory that can be encrypted and accessed (locally or remotely) by using a reference number or other unique identifier to enable the comparison of a newly generated CVL identifier to the previously generated one.

33 Claims, 26 Drawing Sheets

User Entering Unique Identifier to a form in the local computer system

[0001] FIG. 1 is a flow diagram describing the method for the user to enter their unique identifier to a form in the local computer system.
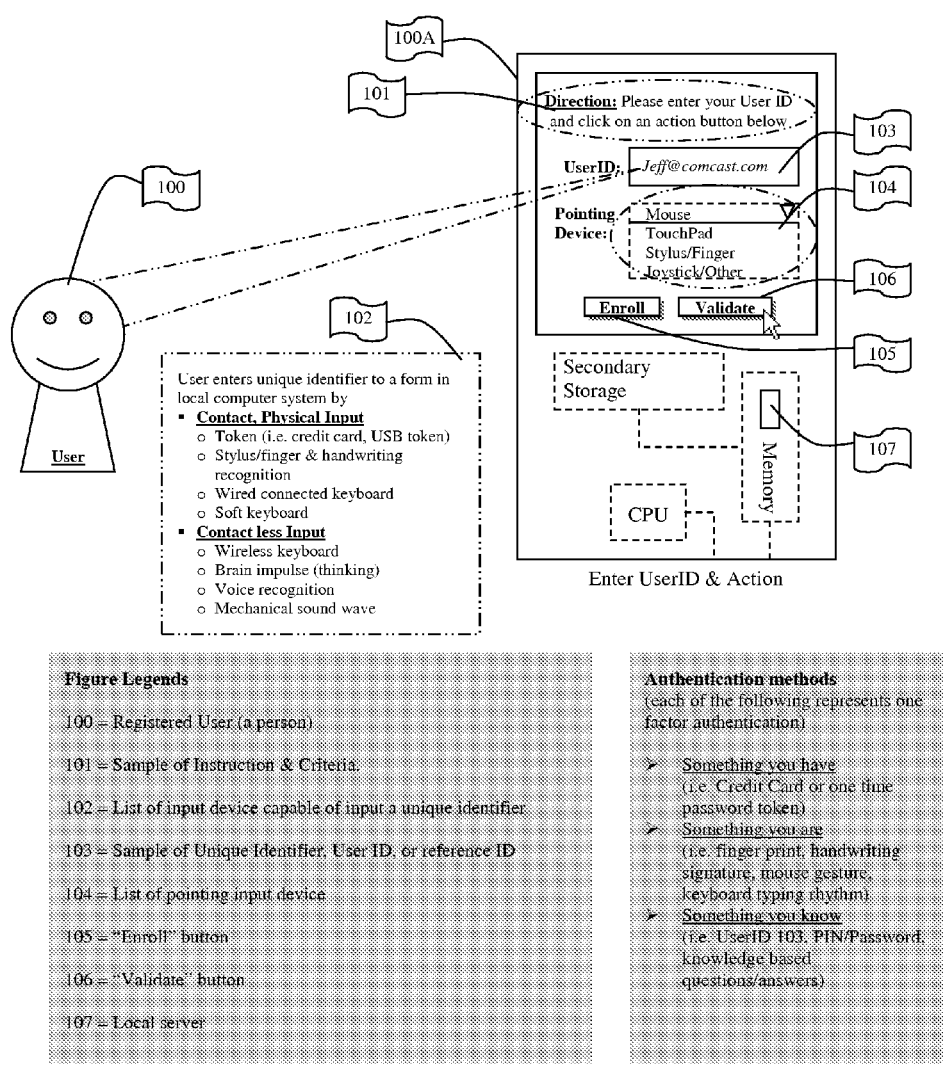
Figure 1: User Entering Unique Identifier to a form in the local computer system

[0002] FIG. 2 is a flow diagram of a typical Local Single System/Server CVL Enrollment.
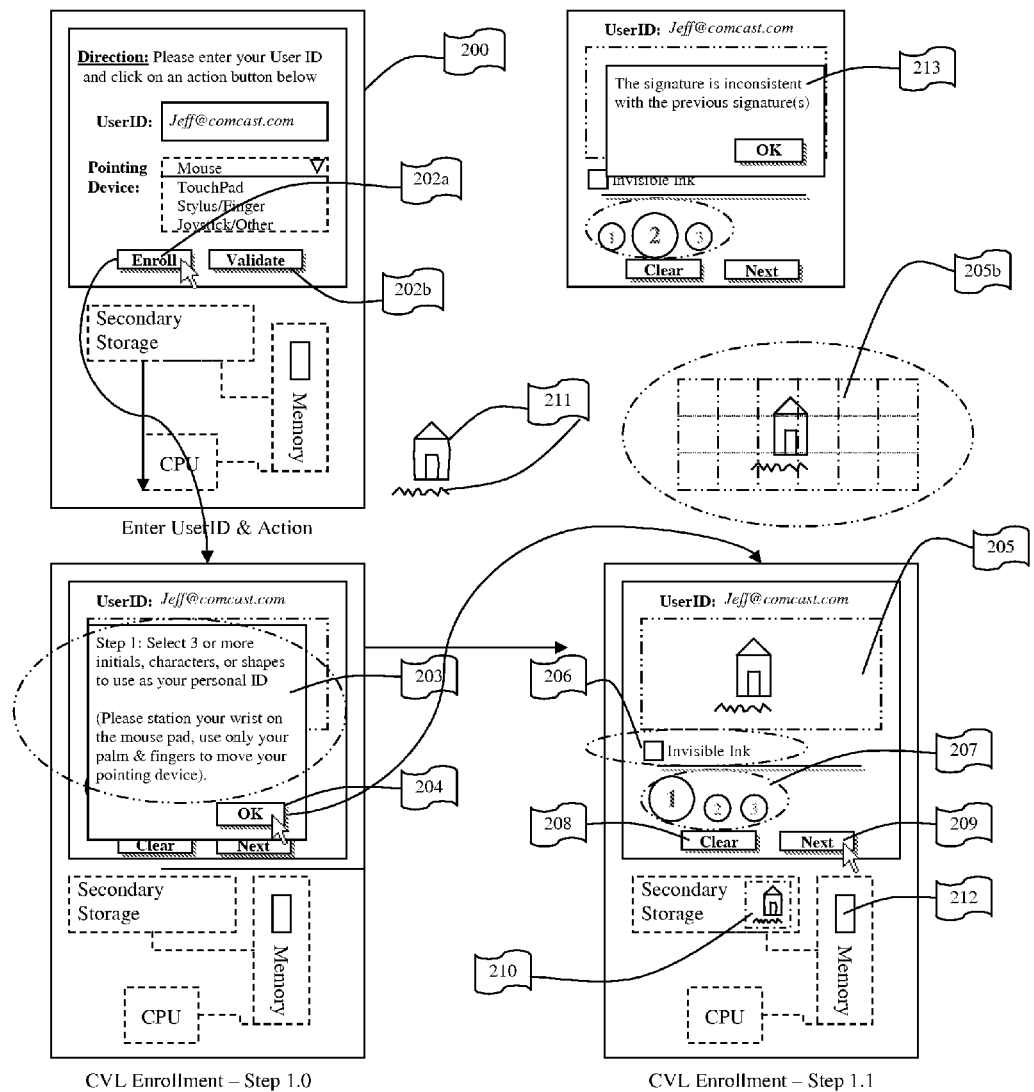
Figure 2: Local Single System CVL Enrollment.

[0003] FIG. 3 is a flow diagram of a typical Local Single System/Server CVL Validation/Verification.
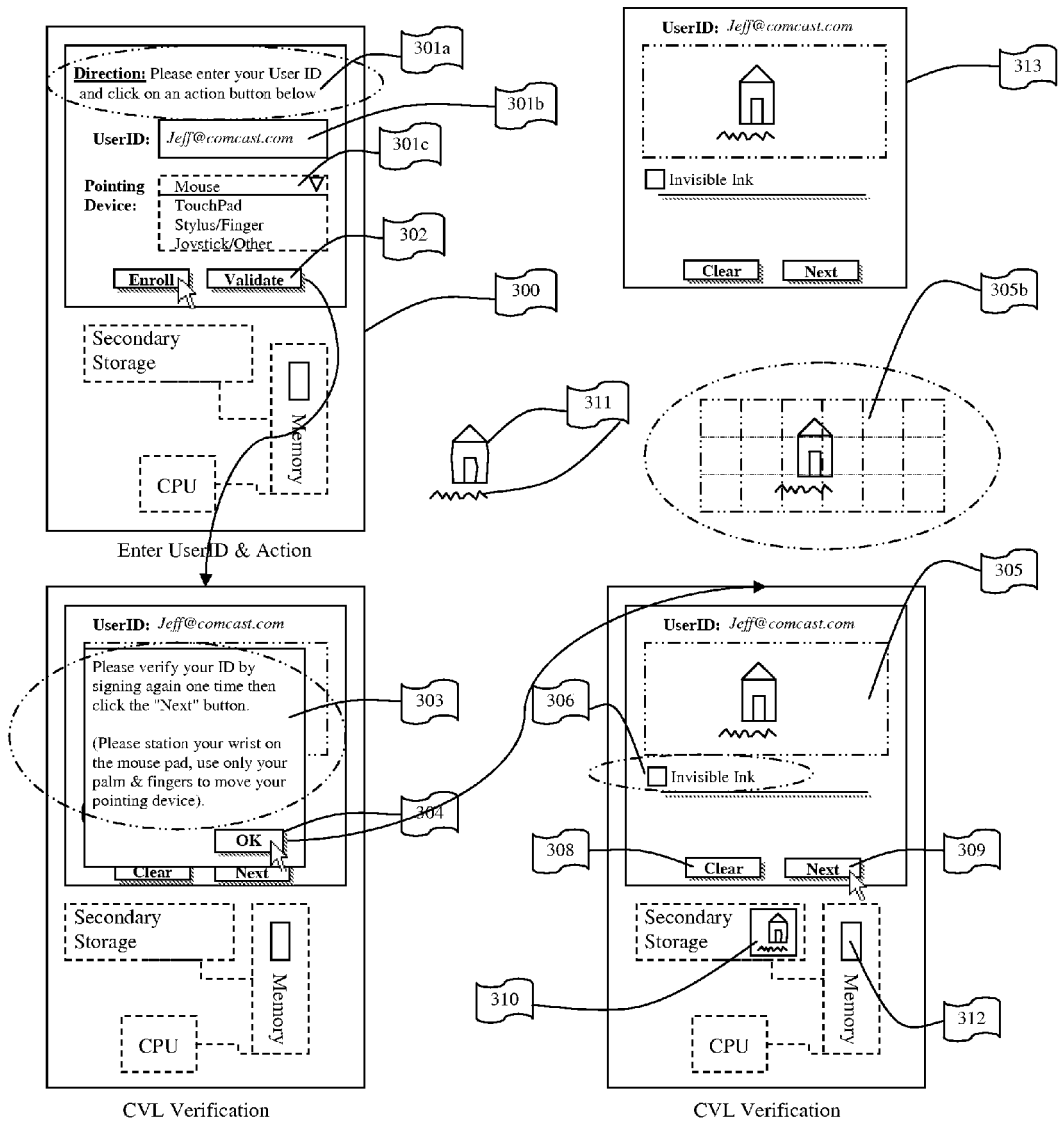
Figure 3: Local Single System CVL Verification.

[0004] FIG. 4 is a flow diagram detailing how a user is allowed access to a local computer upon successfully verifying their CVL identifier.
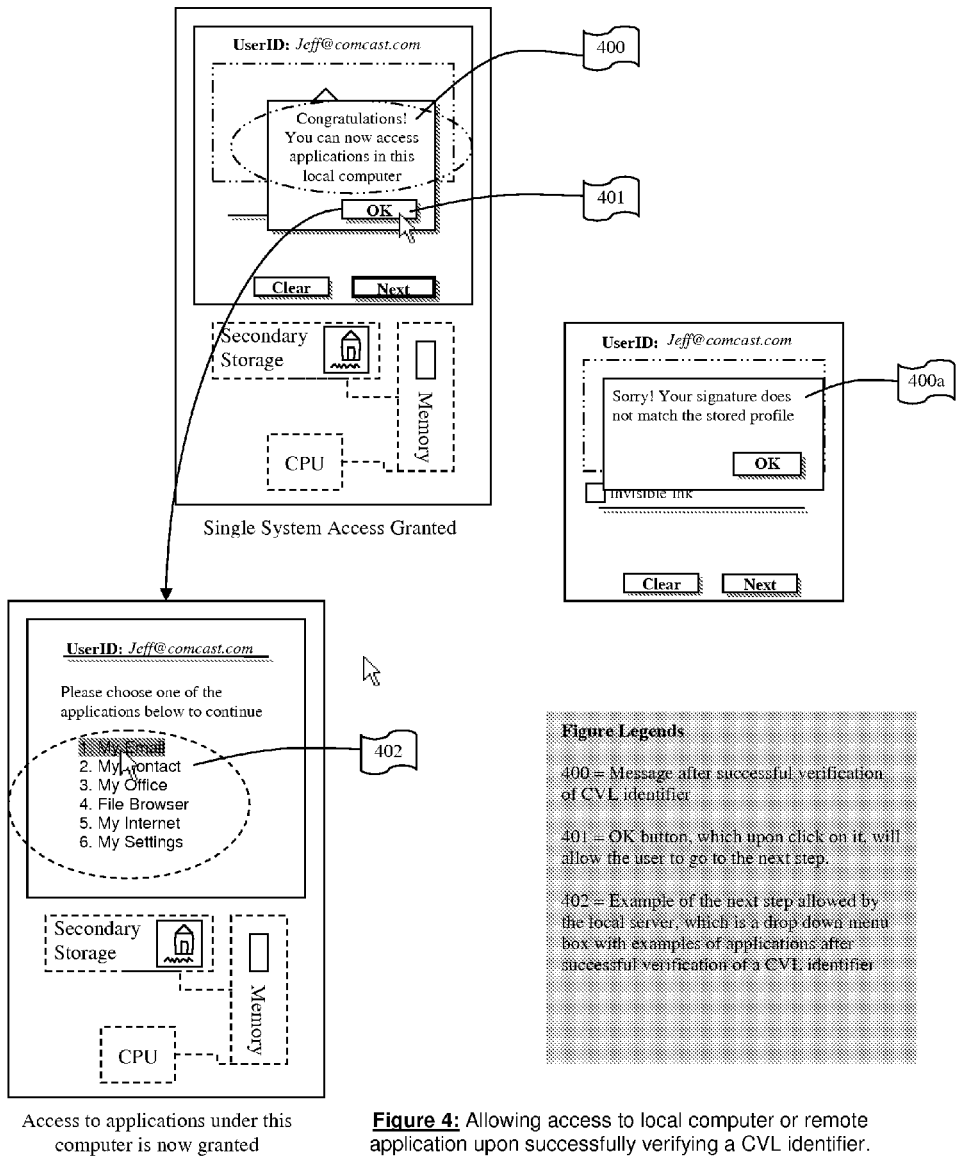
Figure 4: Allowing access to local computer or remote application upon successfully verifying a CVL identifier.

[0005] FIG. 5.1 defines the algorithm to calculate the coordinate position (in pixel unit) of a CVL identifier 501, from the beginning to the ending of the inscription.
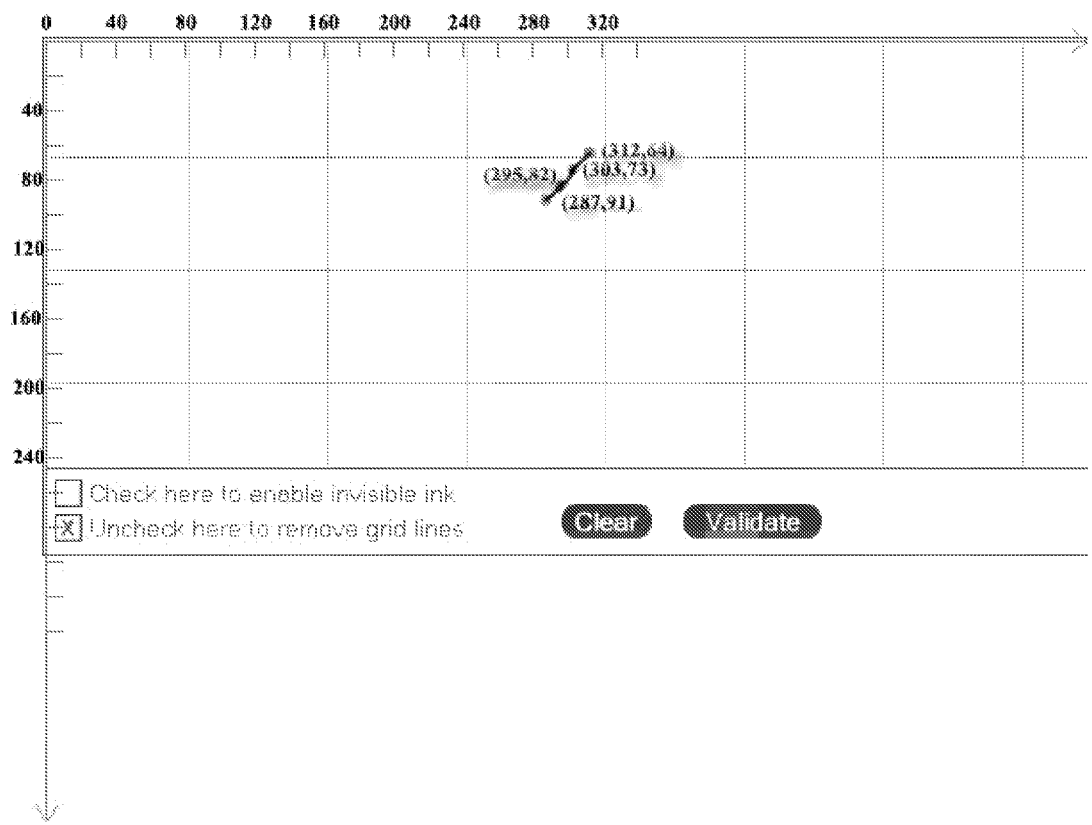
Figure 5.1: Algorithm to calculate the coordinate position beginning with the first clicked point to the last clicked point. The top left dot of the picture has the coordinate of (0,0).

[0005] FIG. 5.2, 5.3, 5.4 defines the data structure of a Continuous Vector Line (CVL), CVL Identifier and a CVL Profile.
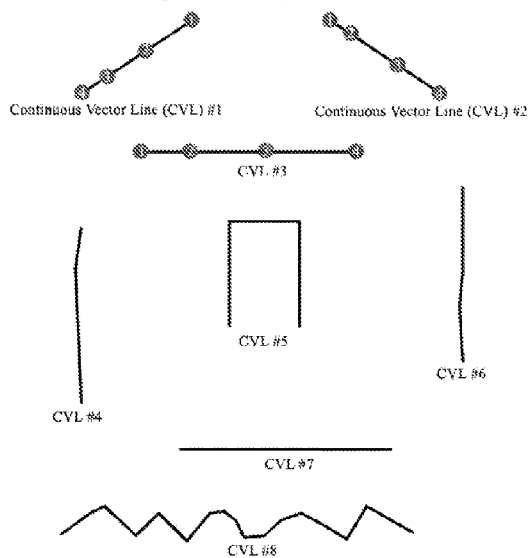
Figure 5.2: Example of a Continuous Vector Line (CVL)
Figure 5.3: Example of a CVL Identifier
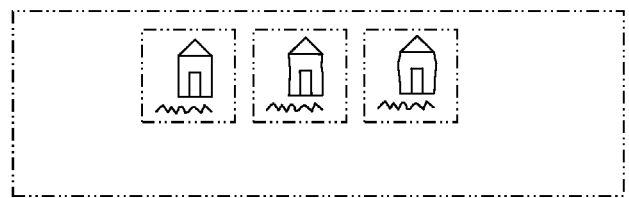
Figure 5.4: CVL Profile, which consists of "pre-determined" CVL Identifiers (in this instance CVL profile consisting of total 3 CVL identifier)

[0006.1] is a flow chart of the communication scheme in the enterprise network between 3 entities CVL capture program, Web server (s) or application server(s) and the Biometric Signature Registry (BSR)

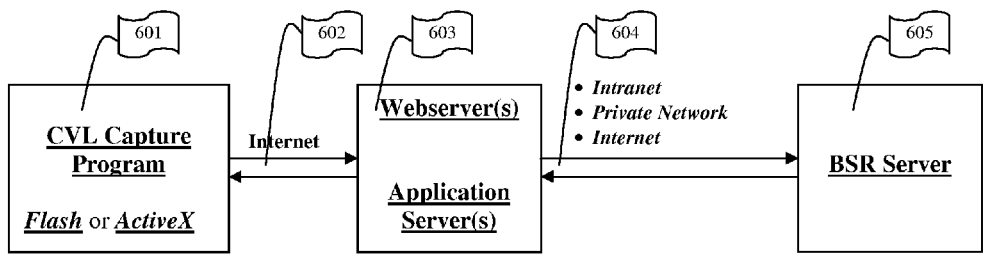

Figure 6.1: Communication scheme in the enterprise network between 3 entities:
CVL Capture Program, webserver(s) or application server(s), and
Biometric Signature Registry Server (BSR Server)

[0006.1] FIG. 6.2 is a flow diagram showing Biometric Signature Registery Server working as a web service
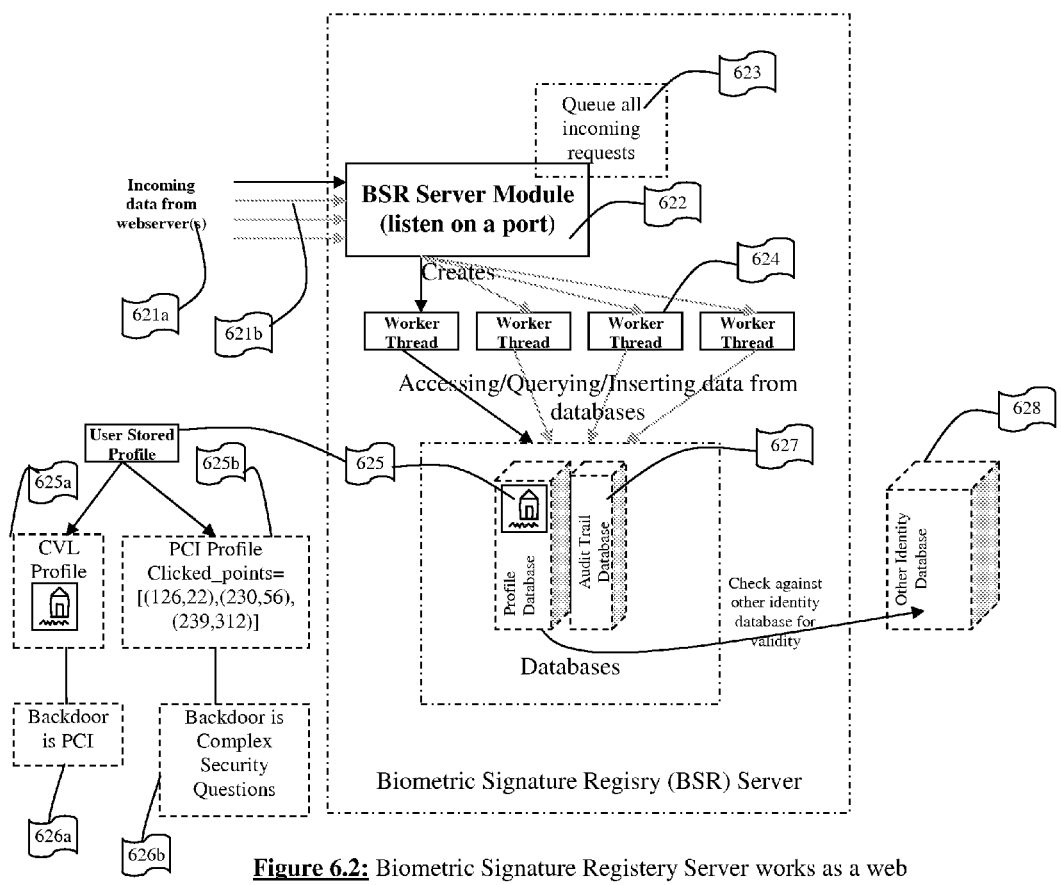
Figure 6.2: Biometric Signature Registery Server works as a web service

[0007.1] FIG. 7.1 is a flow diagram showing the return value (RV) from the BSR upon receiving the given UserID & device name & the request from the webserver to query what type of 2nd Factor Authentication and backdoor.
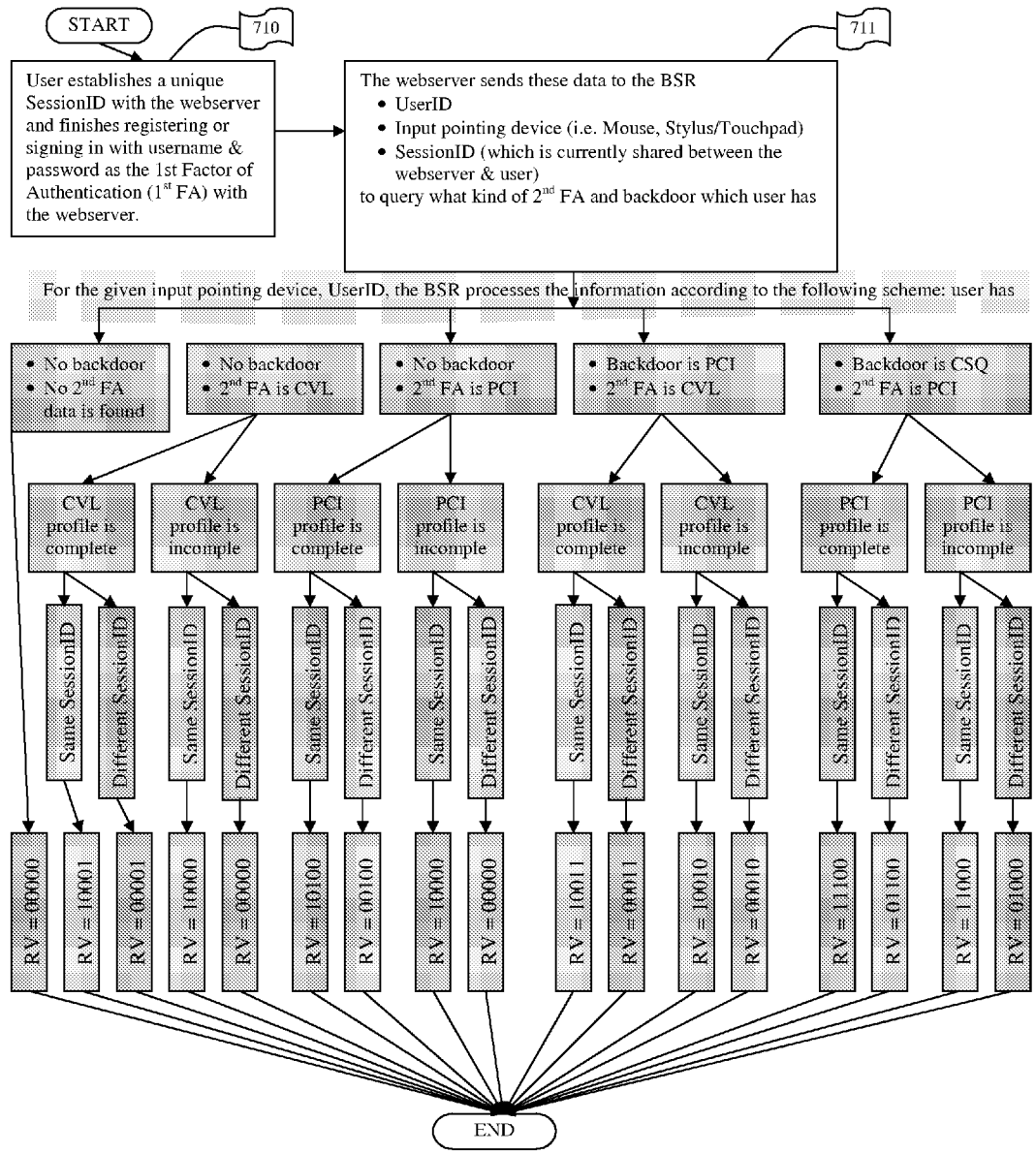
Figure 7.1: Return Value to Query What Type of $2^{nd}$ Factor Authentication and the backdoor for the given UserID & device name

[0007.1] FIG. 7.2 is a flow diagram showing the action, performed by the web server and upon receiving the return value (RV) from the BSR in Step 711 in Figure 7.1
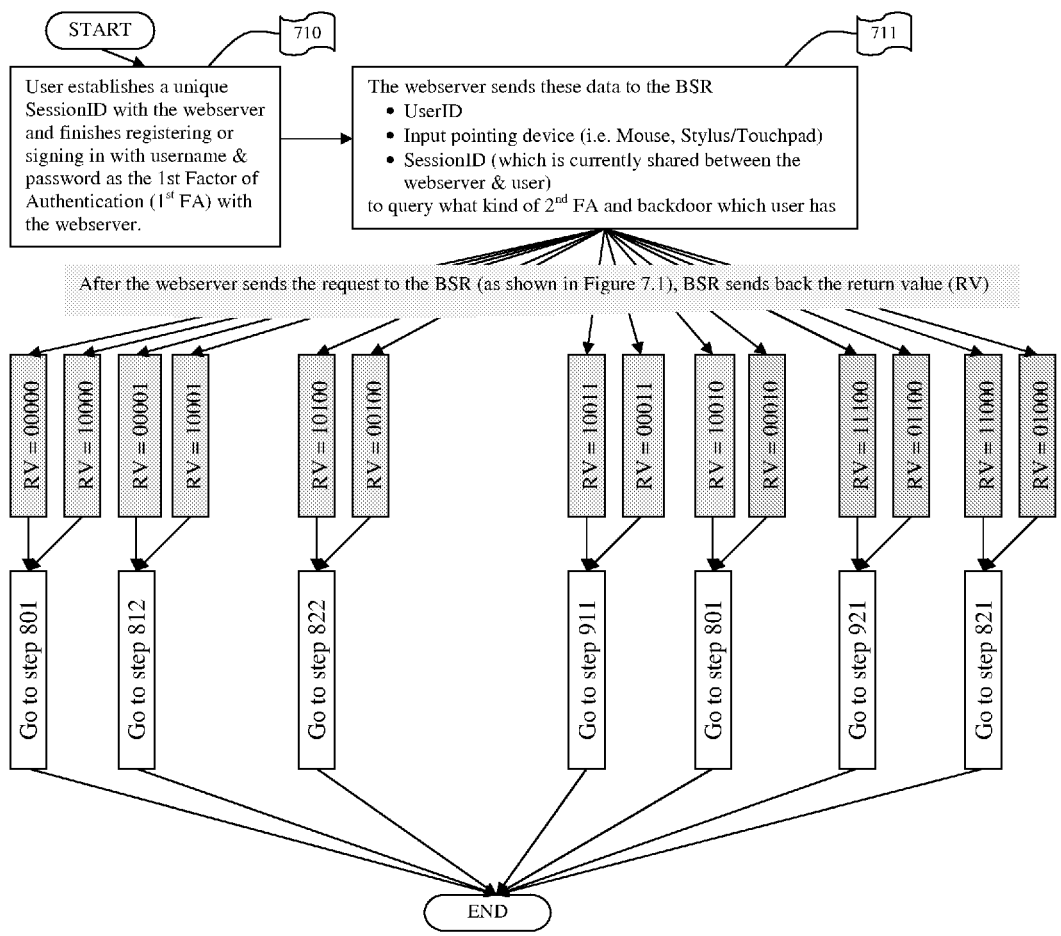
Figure 7: Query What Type of $2^{nd}$ Factor Authentication and the backdoor for the given UserID & device name

[0008.1] FIG 8.1 is a flow diagram of Using a CVL Profile as 2nd Factor Authentication
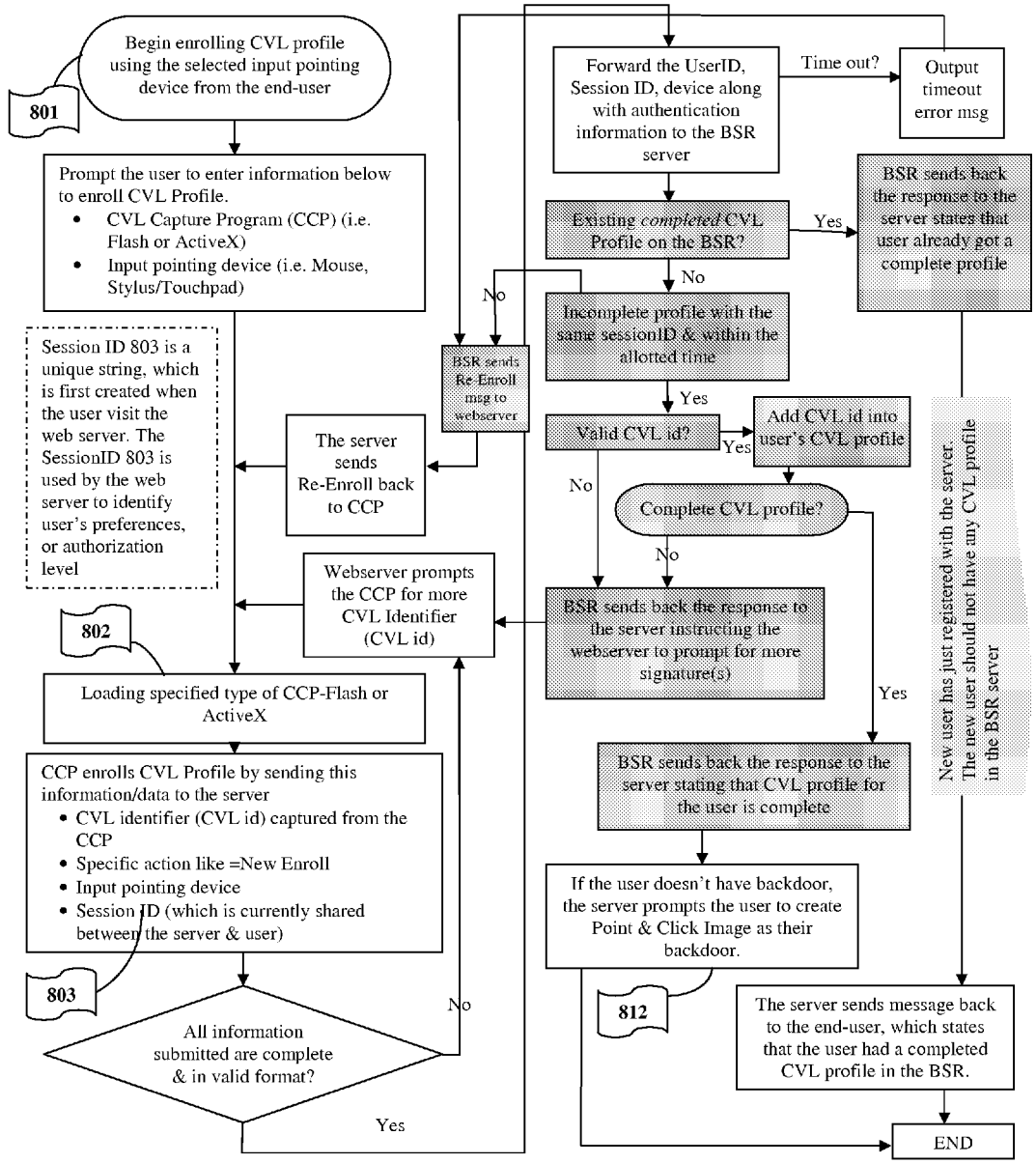

[0008.2] FIG 8.2 is a flow diagram of a Point & Click Image (PCI) as 2nd Factor Authentication when initial enrollment and a CVL profile fails as the 2$^{nd}$ Factor Authentication
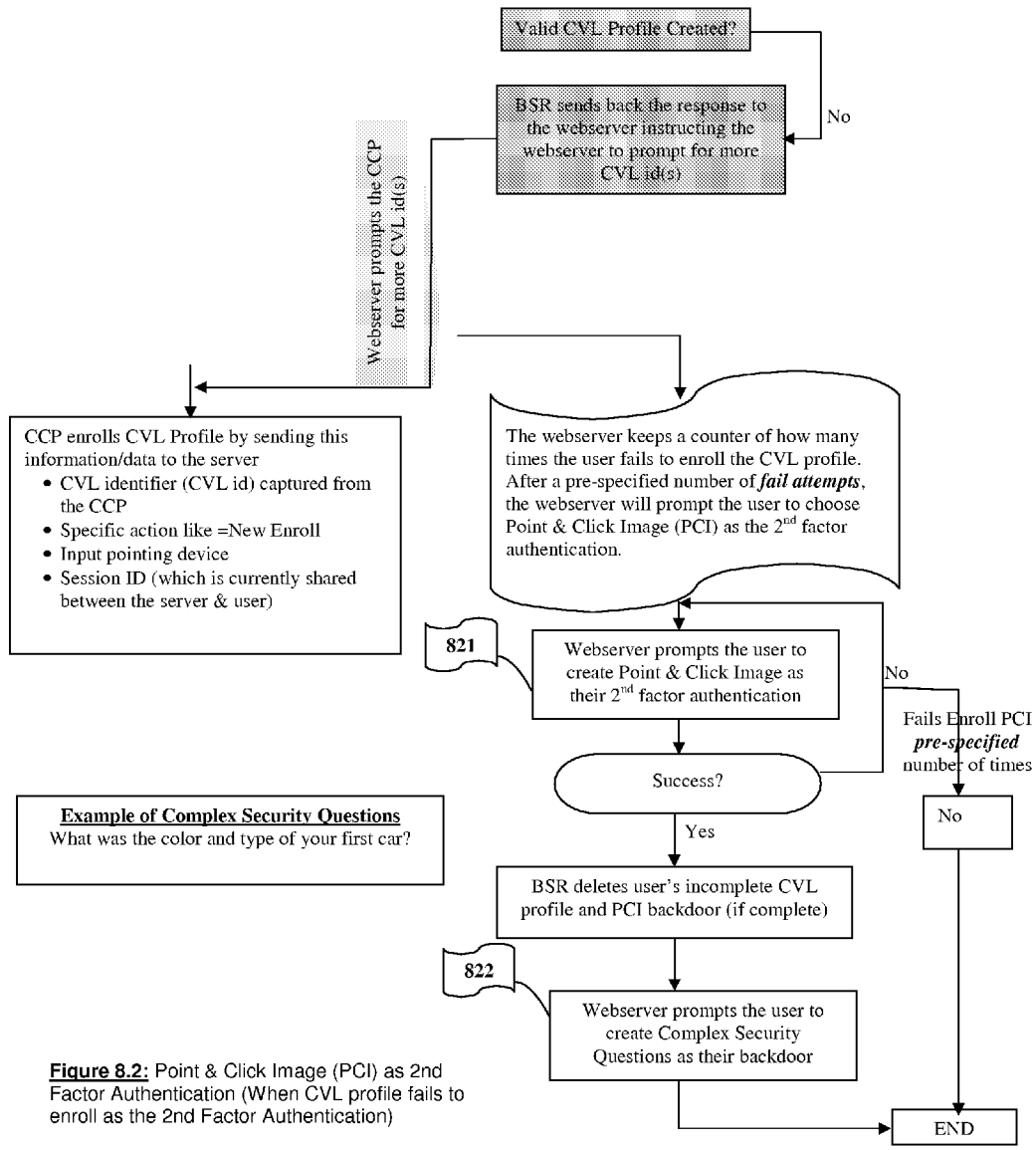
Figure 8.2: Point & Click Image (PCI) as 2nd Factor Authentication (When CVL profile fails to enroll as the 2nd Factor Authentication)

[0008.3] FIG. 8.3 is a flow diagram showing a typical CVL Enrollment with a remote Web Server / Application Server.
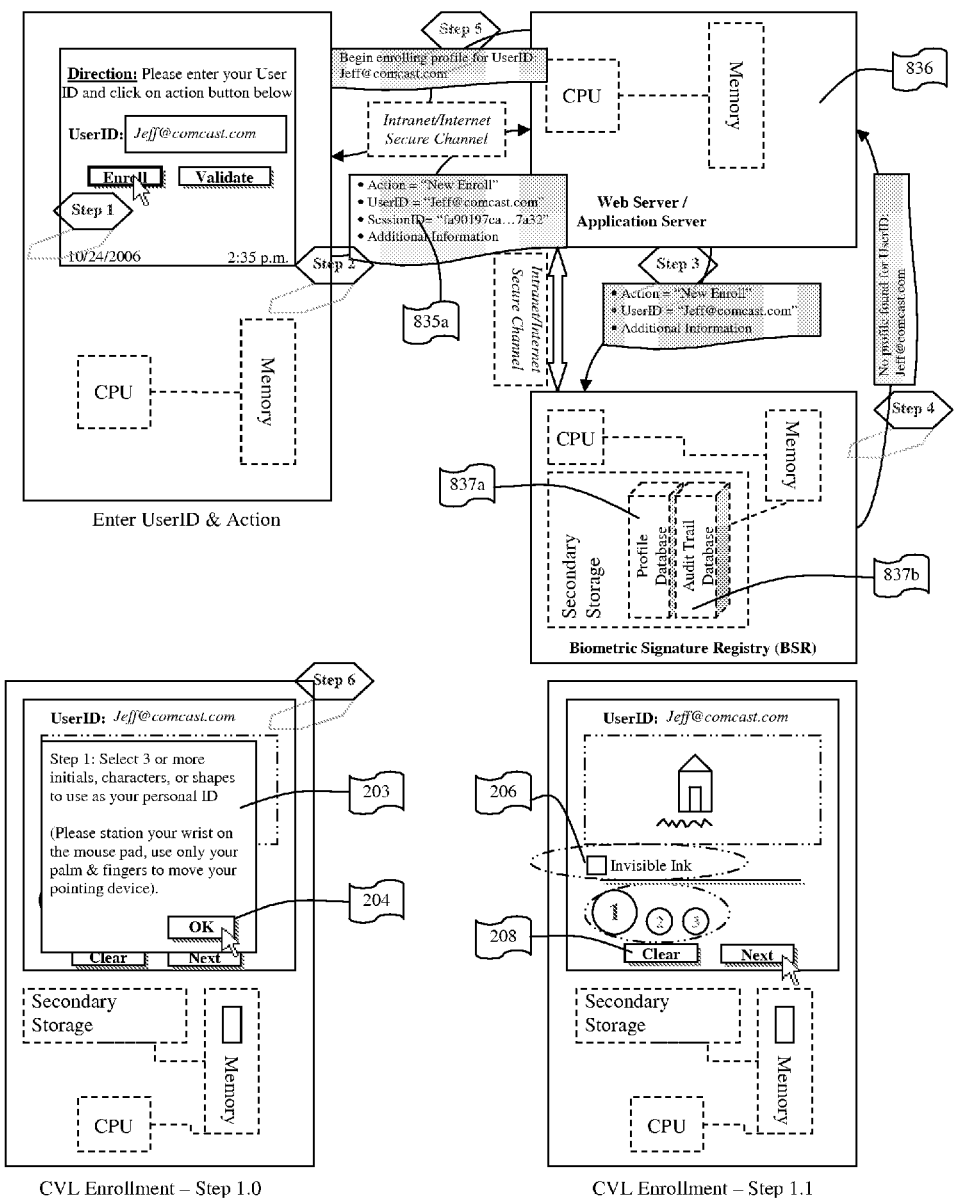
Figure 8.3: flow diagram showing a typical CVL Enrollment with a remote Web Server or a remote Application Server.

[0009] FIG 9.1 is a flow chart for validating a user with 2nd Factor Authentication in the System
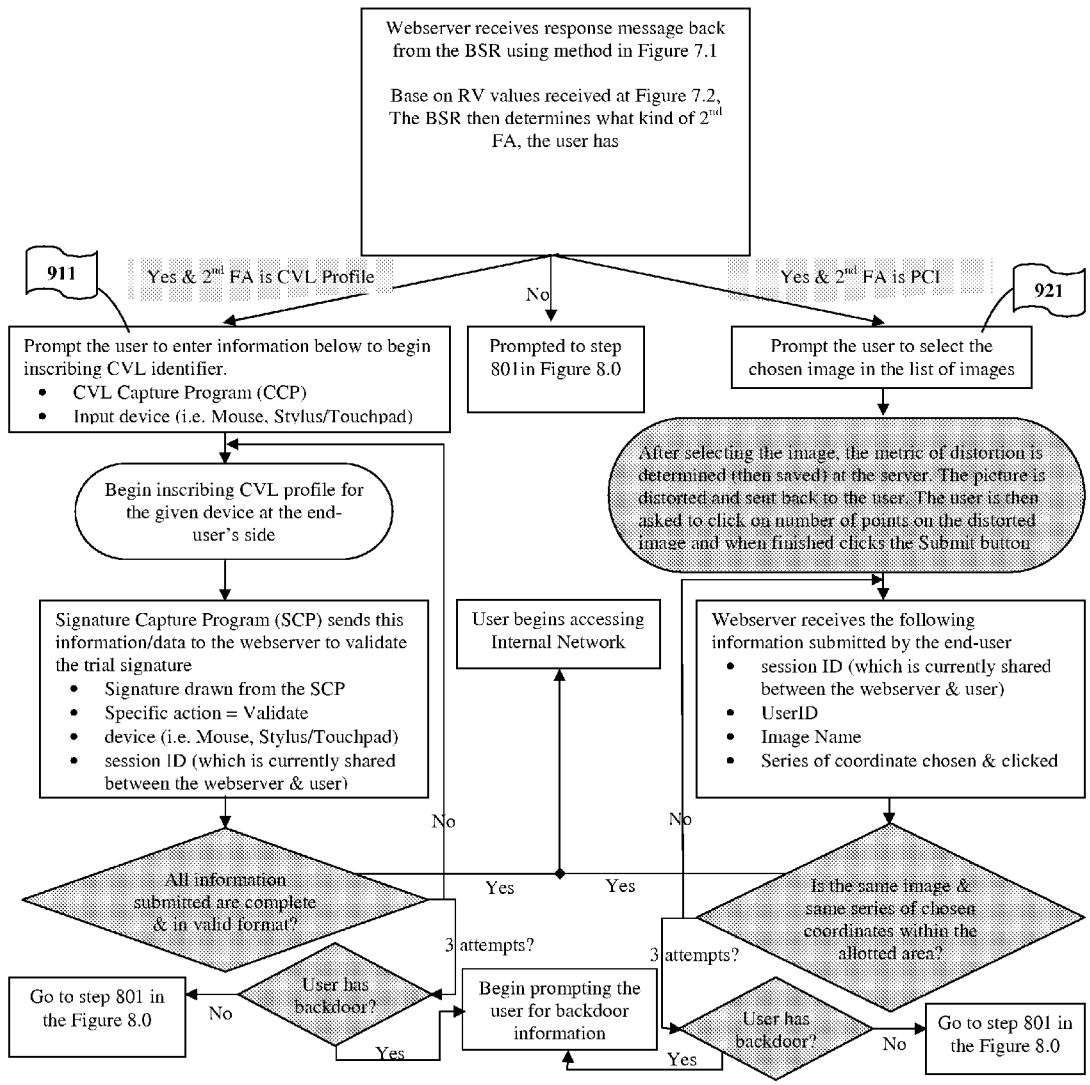
FIG 9.1: Process of Validating a user with 2nd Factor Authentication in the System

[0009.1] FIG. 9.2 is a flow diagram of the steps involved in a typical CVL Validation/Verification with a remote Web Server or a remote Application Server.
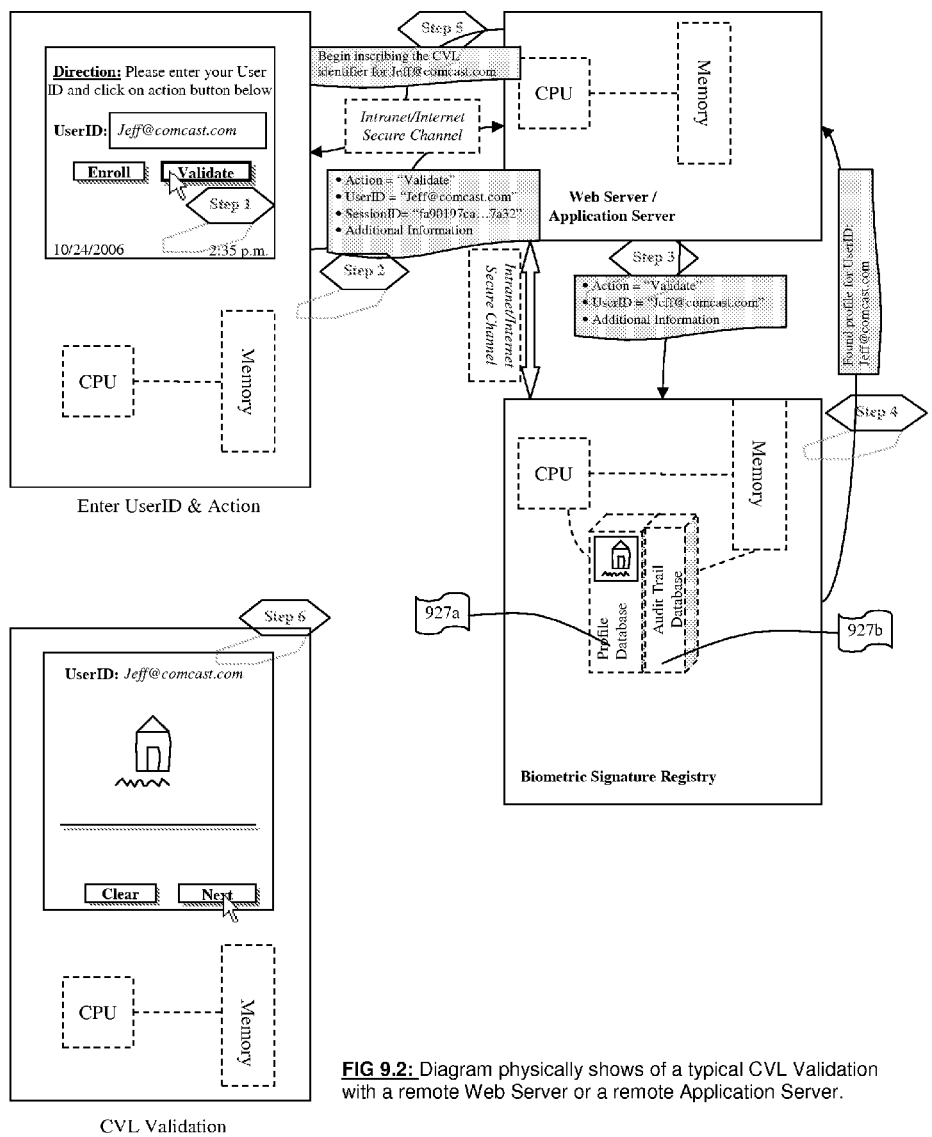
FIG 9.2: Diagram physically shows of a typical CVL Validation with a remote Web Server or a remote Application Server.
CVL Validation

[0010.1] FIG. 10.1 is a flow chart of the algorithm used to enroll the trial collection of points to create a stored Point and Click (PCI )collection of points.
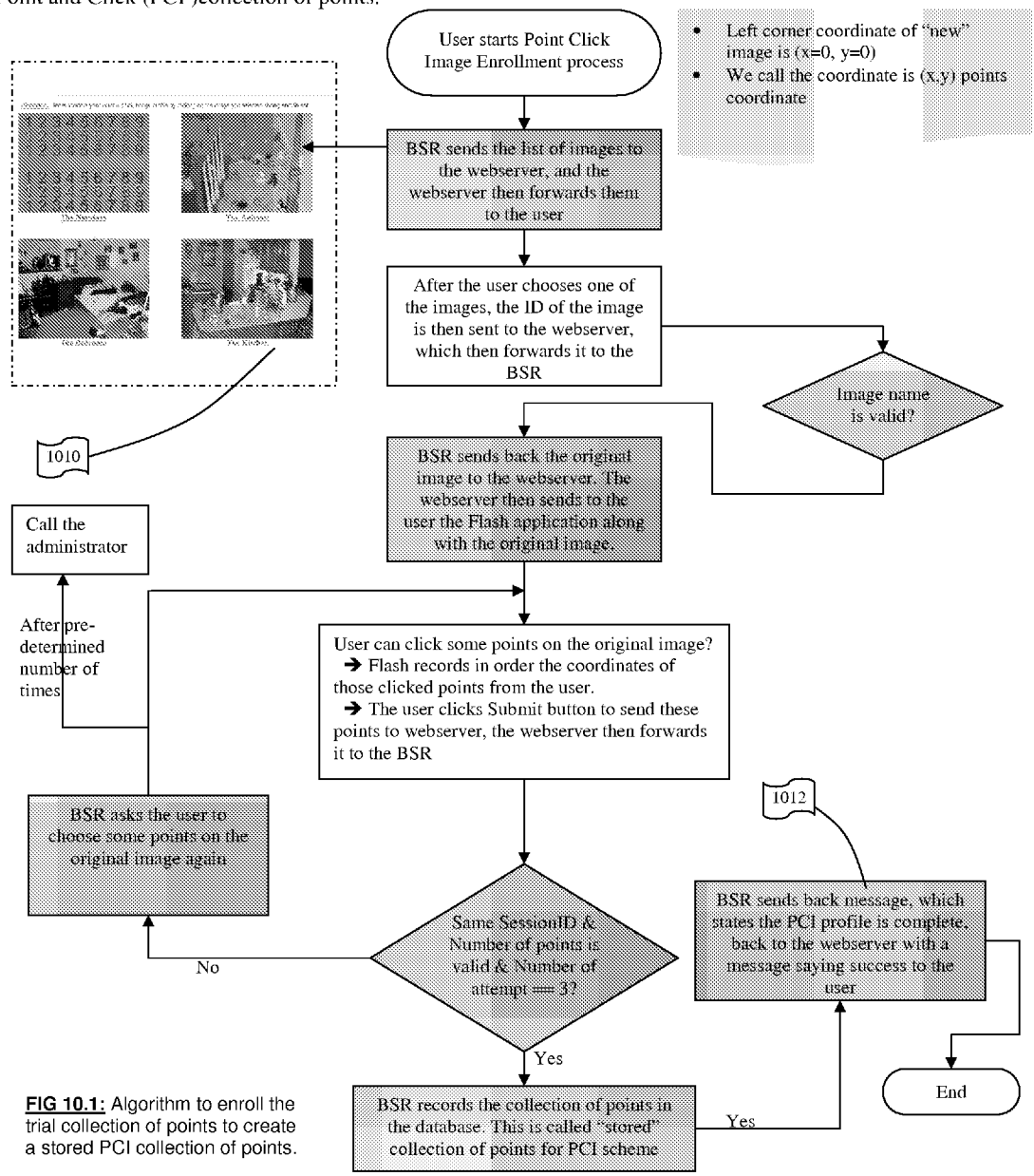
FIG 10.1: Algorithm to enroll the trial collection of points to create a stored PCI collection of points.

[0010.2] FIG. 10.2 is a sample screen shot of the computer application to enroll the trial collection of points to create a stored Point and Click (PCI )collection of points.
*Note the three points selected by dots are on the door handle, thermostat and picture frame FIG 10.3 defines the algorithm to calculate the coordinate position (in pixel unit) of given clicked points
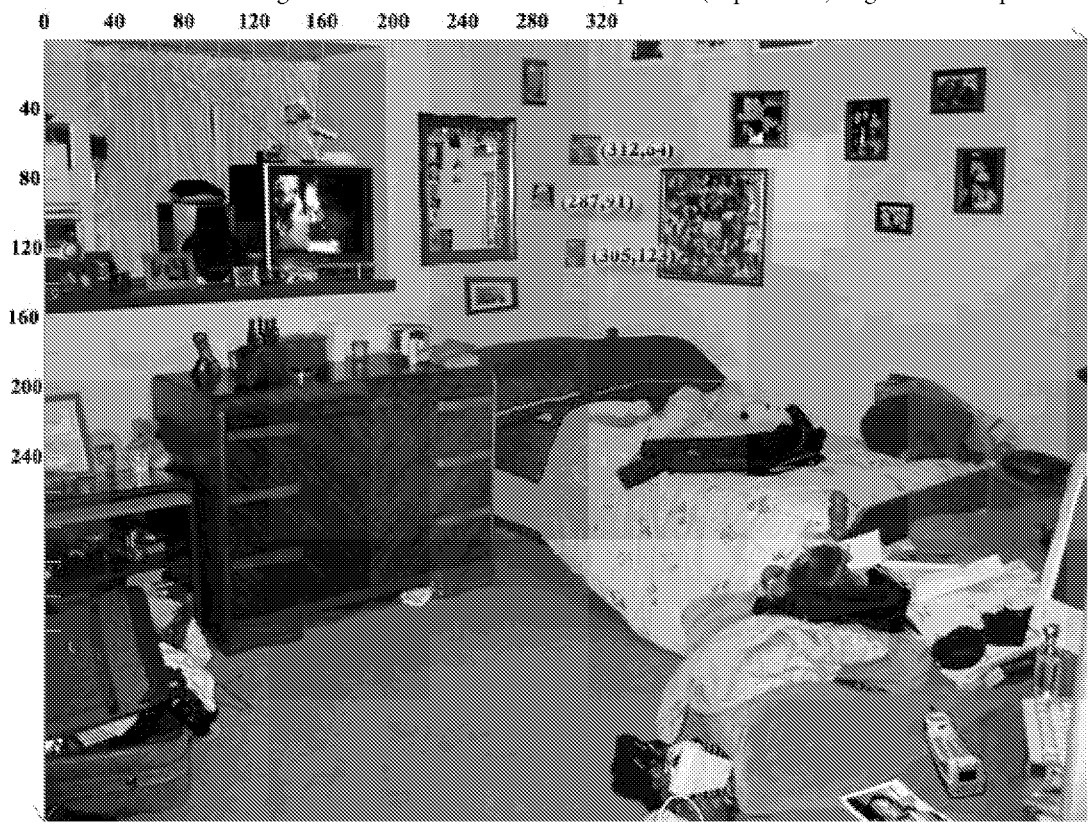

[0011.1] FIG. 11.1 is a flow chart of the Algorithm to validate the trial collection of points against the stored PCI collection of points.
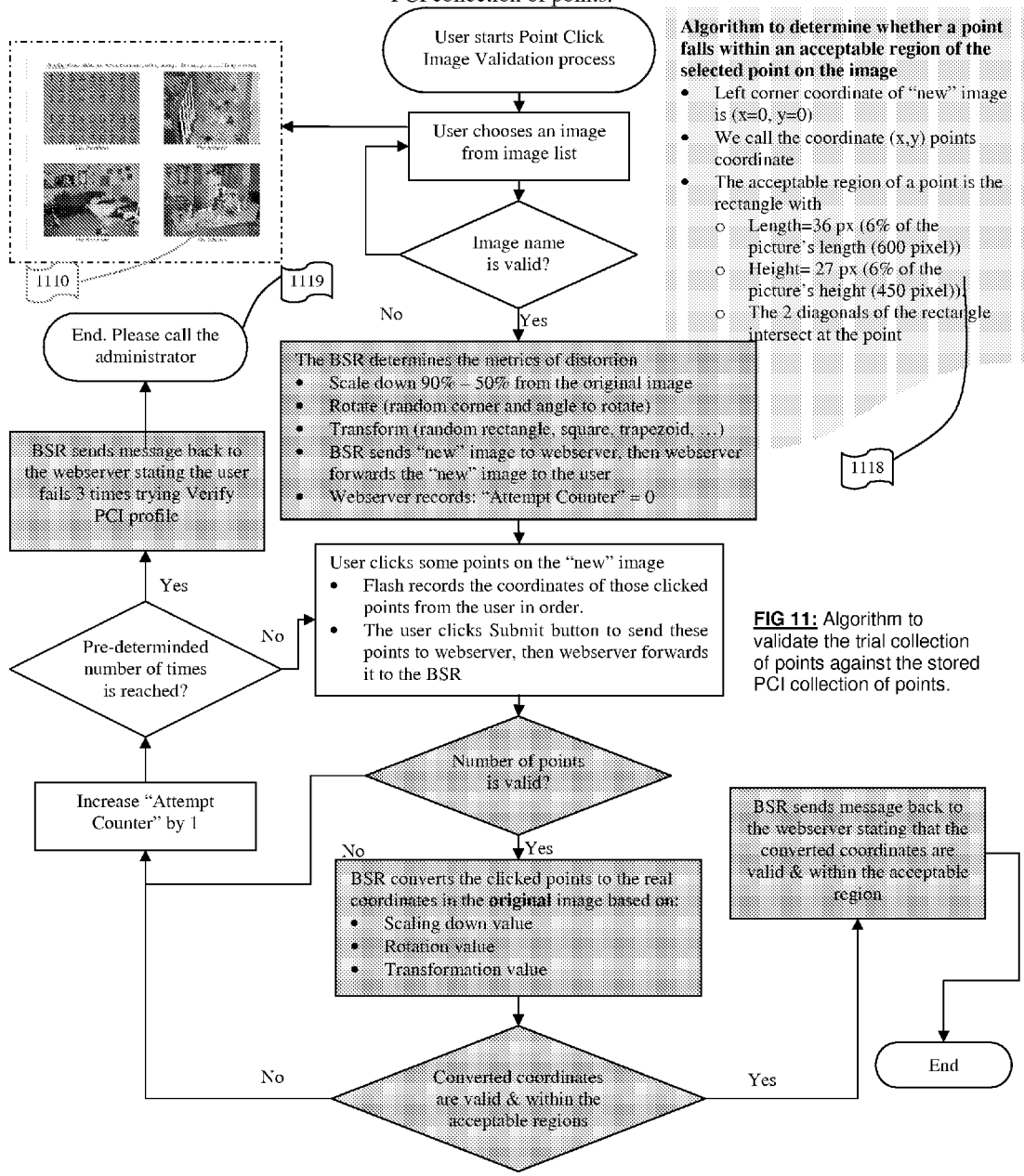
FIG 11: Algorithm to validate the trial collection of points against the stored PCI collection of points.

[0011.2] FIG. 11.2 is a sample computer screen shot of the Computer Interface to Verify the trial collection of points against the stored PCI collection of points.
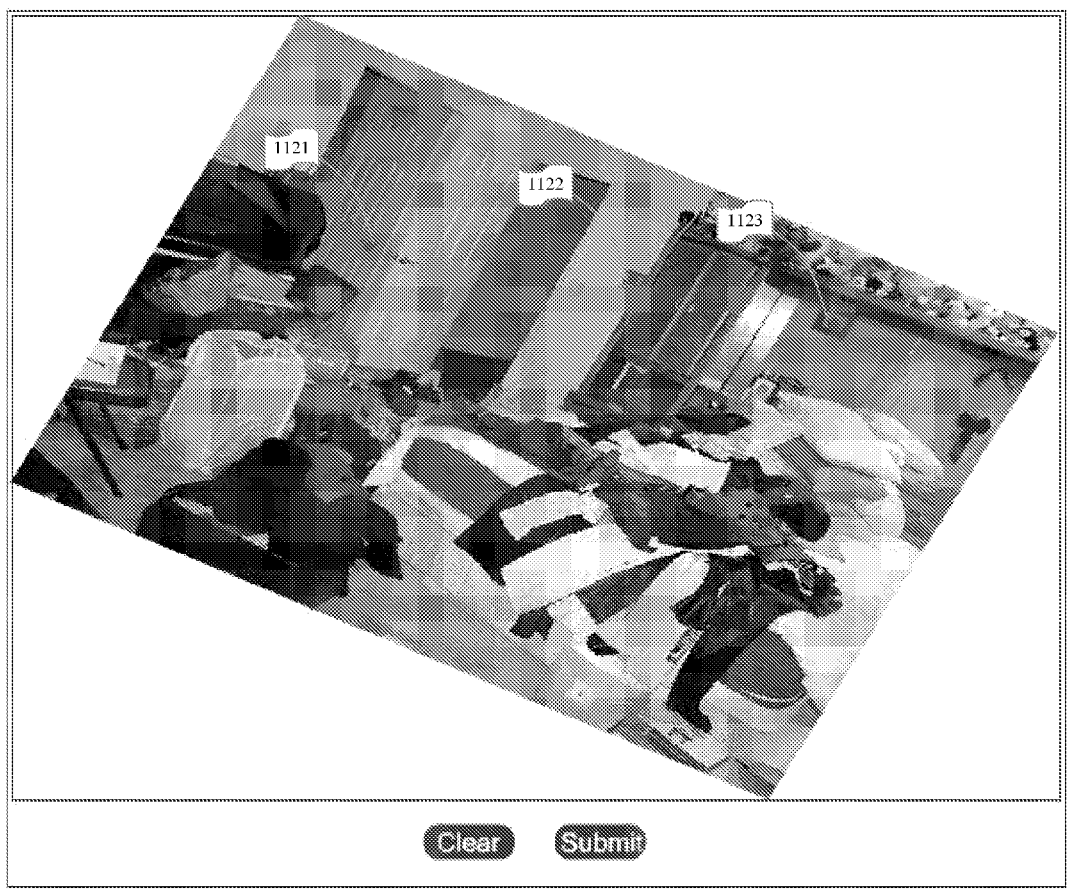

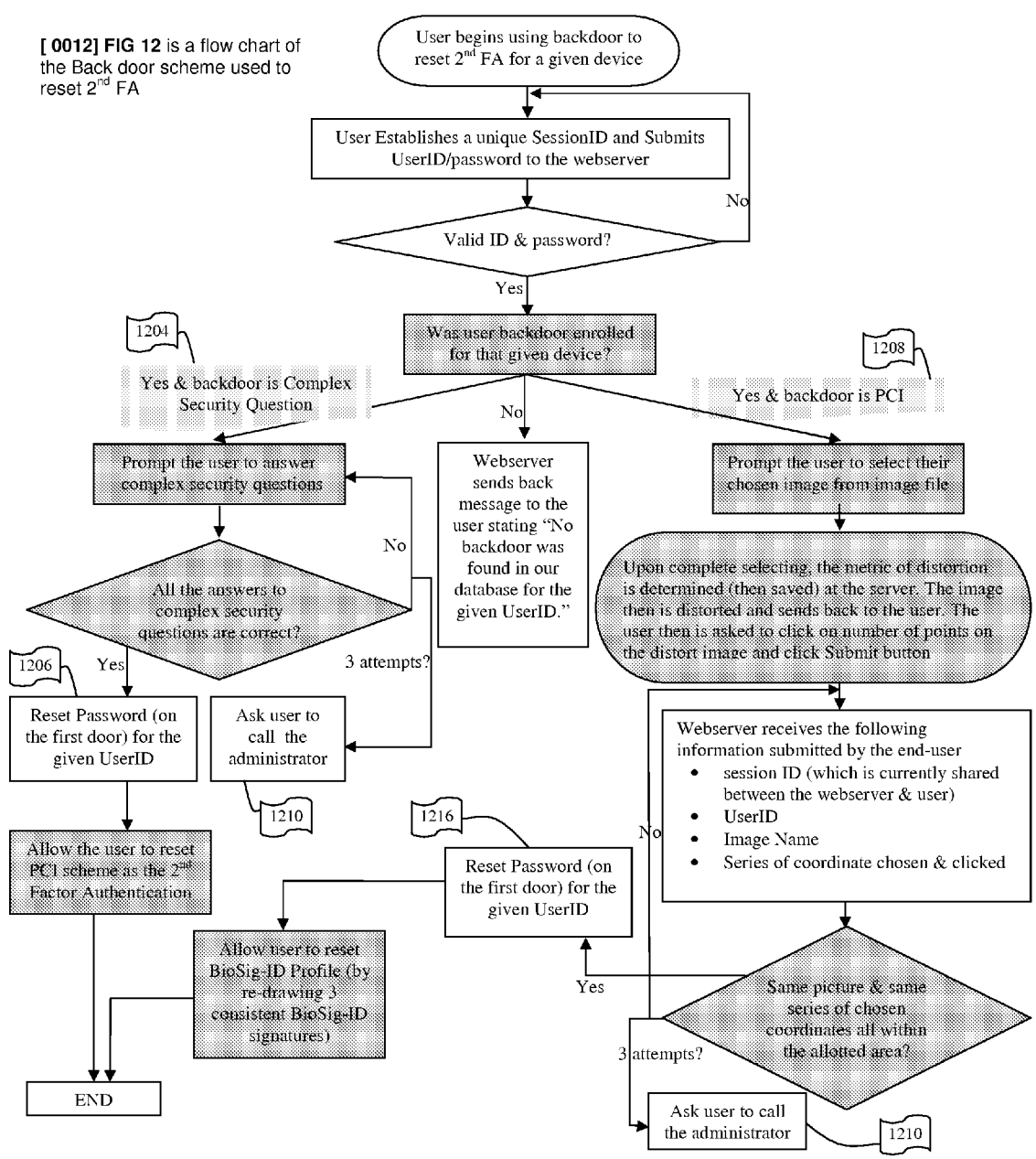

[0013.1] FIG. 13 example screen shots of the "push down" technique, which uses only the palm and fingers to move the cursor of the pointing device to inscribe with this defined anatomical technique.

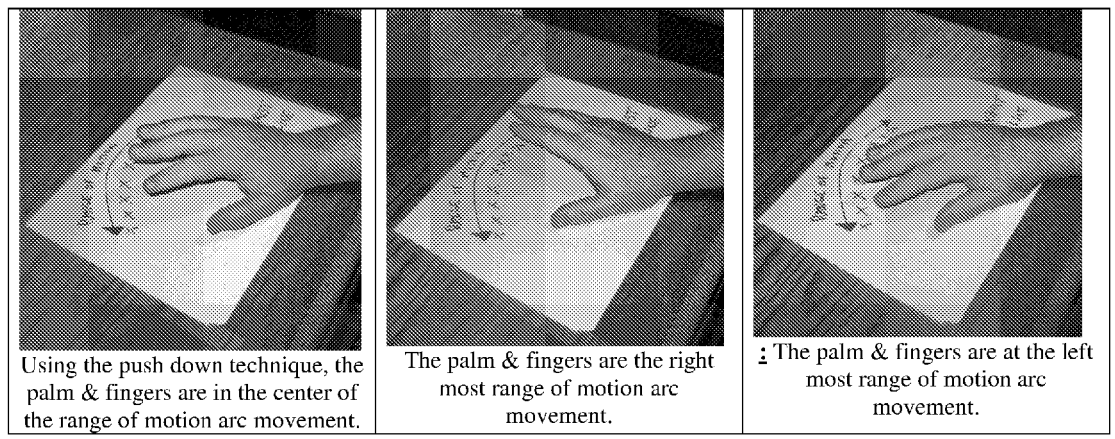

| Using the push down technique, the palm & fingers are in the center of the range of motion arc movement. | The palm & fingers are the right most range of motion arc movement. | : The palm & fingers are at the left most range of motion arc movement. |

FIG 13: Example of the writing surface and the position of the wrist and the range of motion arc from the palm and fingers.

FIG 14: Example of the range of motion arc from the palm and fingers as drawn with an input pointing device (mouse)

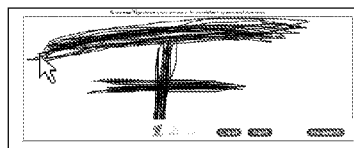

FIG 14.1a: The cursor is at the left most position with the corresponding mouse movement on Figure 14.1b

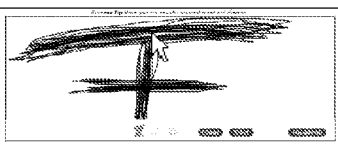

FIG 14.2a: The cursor is at the center location with the corresponding mouse movement on Figure 14.2b

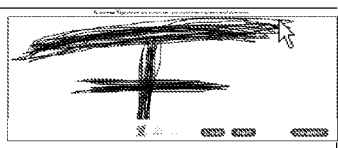

FIG 14.3a: The cursor is at the right most position with the corresponding mouse movement on Figure 14.3b

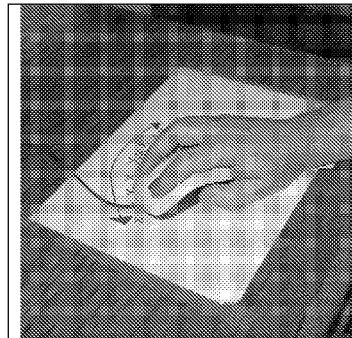

FIG 14.1b: The mouse movement is at the left most range of motion.

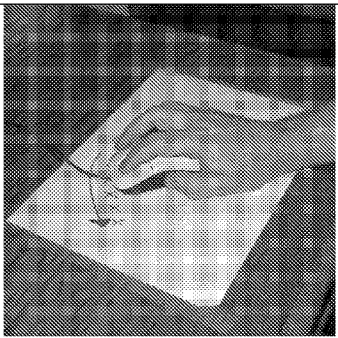

FIG 14.2b: The mouse movement is at the center of the range of motion.

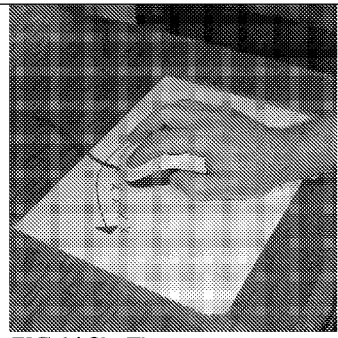

FIG 14.3b: The mouse movement is at the right most range of motion.

[0015.1] FIG. 15.1 Algorithm to describe how an Identity Reputation Score is created using other identity databases
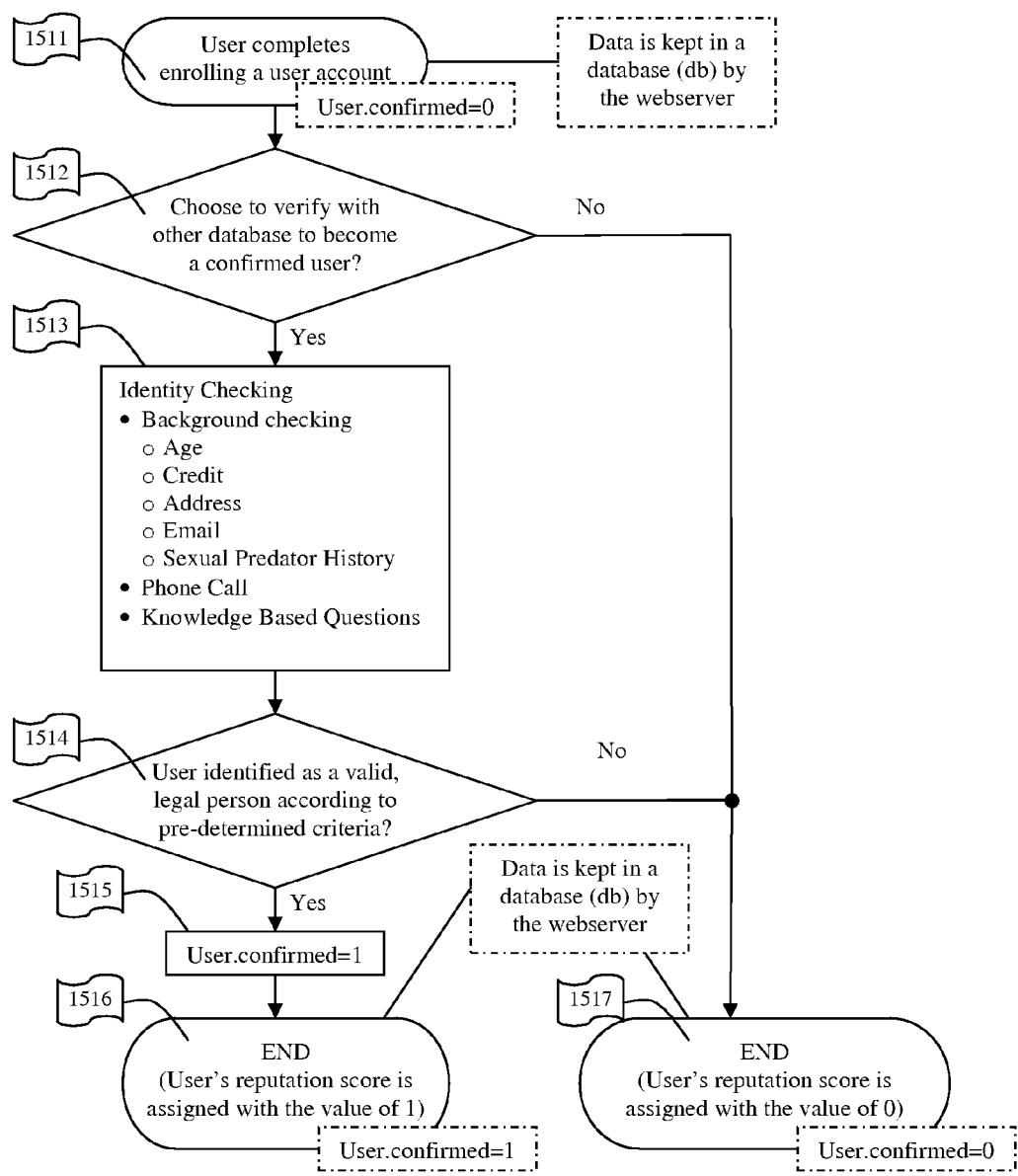

Figure 15.2 Algorithm for increasing a user reputation score after the user has been confirmed and has a reputation score being at least 1 (as illustrated in FIG 15.1)
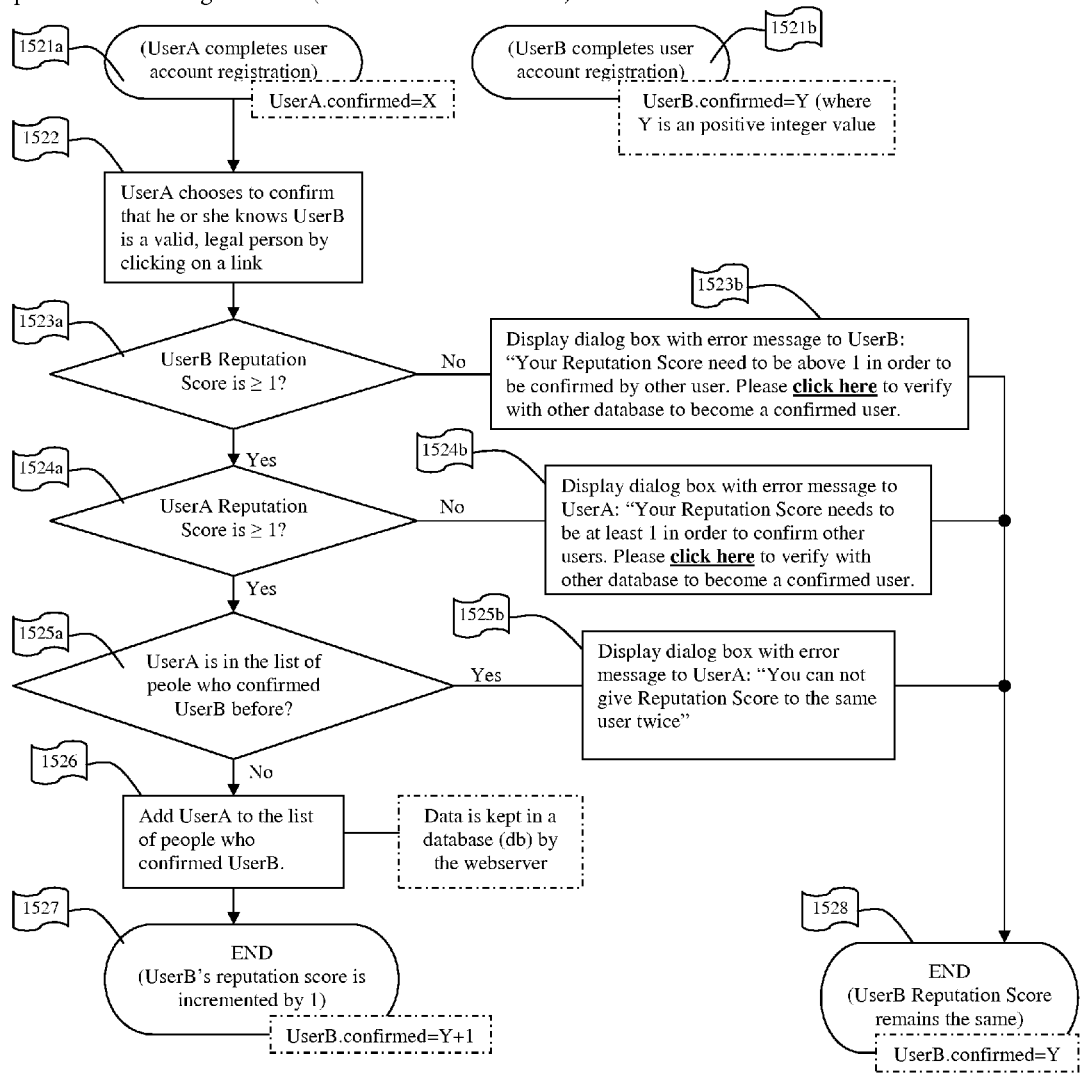

[0016.1] FIG. 16.1 examples of how the icon and the Reputation Score appears after the confirmation of the identity checking.

Figure 16.1: Different color in the icon (in this instance a star). If the Reputation Score is less than 50, the color of the icon is different than the reputation score greater than 50.

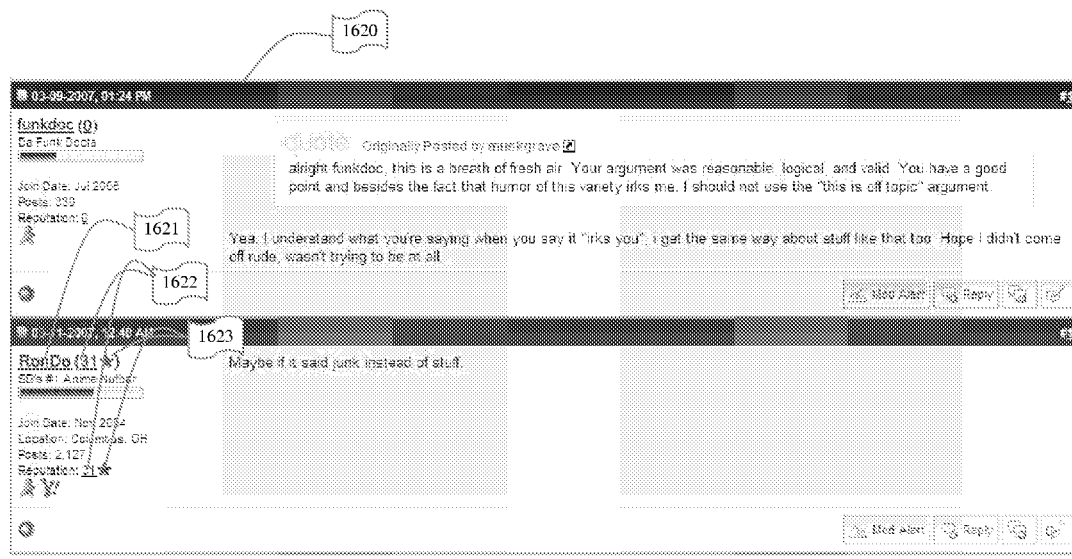

Figure 16.2: Sample of identity reputation of a user that is depicted everywhere a user id appears in the webserver.

SYSTEM FOR AND METHODS OF STORING AND COMPARING COMPUTER GENERATED CONTINUOUS VECTOR LINES THROUGH A NON-SECURE OR A SECURE COMMUNICATION CHANNEL

CROSS-REFERENCE TO RELATED APPLICATION

This is a Continuation of application Ser. No. 10/957,581 filed Oct. 5, 2004 now U.S. Pat. No. 7,663,614 and entitled "Method for Storing and Comparing Computer Generated Lines".

TECHNICAL FIELD OF THE INVENTION

The present invention is directed to an automated computer based verification system of and method for performing an analysis of two continuous lines consisting of more than a single point to form a continuous line generated from the same user, from any computer pointing device, such as a mouse, stylus, touchpad, eraser stick, trackball, joystick, digitizer tablet pen or any physical input such as a finger or input from other body movements, or input from electrical current or impulses, or input from human or mechanical sound waves, in a specific format and comprised of 2 main processes: Enroll a Profile and Verify against a Profile. The user is given instructions to begin use of the system as follows:

i. In the enroll process, a user uses an available input device (such as computer keyboard, finger, soft keypad, or any other input from body movements or input from electrical current or impulses, or input from human or mechanical sound waves), or through a token (such as credit card, USB token, which can be carried around by user), which is capable of sending the unique identifier or reference code (such as a personal identification number (PIN), or password or other secret code) to the physical machine by making a contact or contact less.

ii. A user then selects the name of the pointing input device, which is capable of capturing the Continuous Vector Line (CVL) identifier (such as a mouse, stylus, finger, touch pad, joystick, or other advanced pointing input device) from a radio button list or drop down list, or using a method where the capture pointing input device can be determined automatically.

iii. Using the pointing input device that was selected in step ii above, the user then completes inscribing a CVL identifier, which is comprised of 1 or more (CVL's), according to certain criteria and instructions provided. The user moves the pointing input device using the "push down" technique according to the instructions provided so the wrist remains stationary and only the palm and fingers move the cursor on a draw-able area shown on the displayed screen of the user's collecting device.

iv. The user then submits the information in step i and ii by clicking on the "Enroll" submit button, which sends the input into a server, or local running active content.

v. User's who select computer pointing devices like a mouse, stylus, eraser stick, touchpad, pen or finger are taught to grasp the pointing device in a specific anatomical way to capture certain physical biometric data and to ensure repeatable movement of the pointing device.

vi. The user submits their unique completed CVL identifier to the server, or a local running active content by clicking on the "Next" button and repeating this process of creating a CVL identifier a specified number of times to create a CVL profile unique to that user and submitting the CVL identifier to the server, or a local running active content.

vii. The user may view his CVL identifier on the displayed screen of the collecting device, or elect to use invisible ink, which does not display the CVL identifier on the screen of the collecting device, or use some combination of visible and invisible ink.

viii. The CVL profile can be stored in an encrypted or unencrypted form in the computer registry, or memory, or database, or any computer storage device. Subsequent CVL identifiers generated by the same user using any computer pointing device are also stored in the computer registry, or memory, or database, or any digital storage device to enable the immediate comparison of the CVL identifier generated at time 2, to the CVL identifier or CVL identifiers in the CVL profile generated and recorded at time 1.

ix. During the enrollment, if the user enters an inconsistent CVL identifier according to pre-determined specifications, the user is asked to re-inscribe and submit a consistent CVL identifier to the server, or local running active content.

x. If the user is unable to submit a consistent CVL identifier after a pre-determined number of attempts, they will be automatically directed to use another approach to enroll.

xi. After the automated computer based verification system has completed its analysis of the two continuous lines and they meet a threshold match the user is directed to a next action automatically or by using a menu drop down box where they select by clicking with their mouse or keyboard or other input device to launch an application or action. The user must complete an enrollment process which involves the use of a reference number and the downloading of an add on like an Active X or a product that does not require an add on to enable the automated computer based verification to collect and analyze threshold matching data and communicate these results to the user or other party.

Verify Against a Profile:

xii. The user follows the same procedure as Enroll a profile except they only need to provide their reference ID and verify against their stored CVL profile once successfully to be permitted to move to the next action. The server does the consistency analysis for the new submitted CVL identifier at time 2, to the CVL identifier or CVL identifiers in the CVL profile, which is identified by the reference code, generated at time 1. If the user is unable to submit a verifiable CVL they are automatically re-directed to the other enrollment process they chose during a previous enrollment process.

The storing of collected data points that represent CVL made previously is kept in a database, registry, or memory and processor like a computer that can be encrypted and accessed by using a reference number or other unique identifier either locally or remotely through any wired or wireless medium such as the Internet, secure File Transfer Protocol (SFTP) server, cellular network or other communication connection to enable the comparison of the new generated CVL to the CVL or (CVL's) to CVL's generated previously. The transmission of the continuous line generated from the user at time 1 and time 2 is sent to the central server or registry or to a local machine configured to act as a server control using secure method of encryption such as Secure Socket layer (SSL), Public Key Infrastructure (PKI) or Advanced Encryption Standard (AES) or similar secure method.

BACKGROUND OF THE INVENTION

The process of visually comparing two continuous lines for equality is well-established. For example, a person is asked to write a continuous line on one sheet of paper and then is asked to write the same continuous line on a second sheet of paper. By visually comparing the two continuous lines, it can be concluded either the two lines are similar or not similar. The visual comparison is time consuming and can result in comparison errors due to human factors. The two continuous lines can be electronically generated and compared using an automated computer based verification system.

A computer mouse, stylus or a digitizer tablet are known for data input applications. Typically, a mouse or a digitizer tablet is used for capturing primarily spatial and sequential information. When a mouse is moved or something is written on a digitizer tablet, the output is a parametric representation of the movement; that is, the writing is represented as a series of x, y coordinate values as a function of time. This feature may be applied to other gathering functions.

The accuracy of an automated computer based verification system relies on the mathematical algorithms and methods of comparing two continuous lines. Today, there are companies who have developed their own automated computer based verification system, but these systems make mistakes in recognizing the differences between two continuous lines and fall short in establishing whether the same user generated both lines. The use of a pointing device like a mouse or stylus to inscribe input into these systems allows for a wide variation of input because the arm and wrist movements can act as a fulcrum effect. The resulting input allows wide variance and limits ability to reproduce input in a repeatable fashion. The present invention teaches the user to use a constrained anatomical position with their wrist and arm thus reducing the wide variance seen with other systems. The present invention corrects for these wide variances and the input can be further analyzed by biometric indices like size of hand and maximum motility reach to create a more reliable and repeatable input to help confirm the matching of two continuous lines.

Further, existing methods do not adequately secure the transmission of the data or packet of information between the point of generation and the receipt of this input at a web based server or device consisting of a memory and processor. Information sent over the Internet or telephone lines can still be intercepted and subsequently utilized for fraudulent means. The security of a users' PIN, password or other personal information is increasingly becoming compromised by hackers who steal users' identities after they hijack their PINS and passwords especially when using the Internet. PINS, passwords, tokens, smart cards are all incapable of authenticating the real user reliably because they can be stolen, lost or borrowed, thereby allowing fraud and misrepresentation. The data that is stored in a registry or database in a server is also not adequately protected by encryption and does not have a reliable secure method of authenticating the actual user or administrator who desires to access the data.

Furthermore, there is a cost associated with loss of personal data, credit cards, account information and other fraudulent actions caused by the theft of these items when a user is online. Accordingly, it is an object of the present invention to provide a quick and secure online method of identification, which is accurate and cost effective.

What is needed is a method for collecting the parametric representation of the movement of any computer pointing device, such as a mouse, stylus, touchpad, eraser stick, trackball, joystick, digitizer tablet pen or any physical input such as a finger or input from other body movements, or input from electrical current or impulses, or input from human or mechanical sound waves. The input is collected in a specific format and at certain time intervals and uses the collected parametric representation to generate certain differentiating factors to provide a highly reliable technique for comparing two continuous lines. Further the data that is transmitted from a user at point A needs to be sent to a server or registry at point B using secure methods like PKI. Once this data is stored in the registry or server, access to it needs to be based on an authentication method using a unique quadrant array analysis as referenced in our Ser. No. 10/957,581 patent Pending filed Oct. 5, 2004 and entitled "Method for Storing and Comparing Computer Generated Lines". The quadrant array analysis of comparing two continuous lines referenced in Ser No. 10/957,581 and the other methods of collecting and analyzing data described in claims 1-33, can include the use of biometrics generated from any computer pointing device, such as a mouse, stylus touchpad, eraser stick, trackball, joystick, digitizer tablet pen or any physical input such as a finger or input from other body movements, or input from electrical current or impulses, or input from human or mechanical sound waves. Furthermore, with the increasing use of the Internet for a myriad of applications and transactions, verifying accurately and reliably a user's identity on-line is particularly desirable.

SUMMARY OF THE INVENTION

In accordance with the present invention there is provided a system for and a method of storing and comparing computer generated vector lines through a secure communication channel. It relates to storing collected data points from any computer pointing device, such as a mouse, stylus, digitizer tablet or any physical input such as a finger or electrical current in a specific format, and more specifically, the comparison of two continuous vector lines generated by a mouse, or any other input or pointing device. The storing of the collected data points that represent a set of data points at time 1, is kept in a data base or registry that can be encrypted and accessed by using a reference number, the generation of a continuous line that achieves a matched threshold level required for access permission or other unique identifier either locally or remotely using the Internet, secure FTP server, cellular network or other secure communication connection to enable the comparison of the new continuous line generated at time 2, to the continuous line generated at time 1.

BRIEF DESCRIPTION OF THE DRAWINGS

Further features and advantages will be apparent from the following detailed description, given by way of example, of a preferred embodiment taken in conjunction with the accompanying drawings, wherein:

FIG. 1 is a flow diagram describing the method for the user to enter their unique identifier to a form in the local computer system.

FIG. 2 is a flow diagram of a typical Local Single System/Server CVL Enrollment to the local server (which is composed of 1 or more local active content).

FIG. 3 is a flow diagram of a typical Local Single System/Server CVL Verification to the local server (which is composed of 1 or more local active content).

FIG. 4 is a flow diagram detailing how a user is allowed access to a local computer upon successfully verifying their CVL identifier.

FIG. 5.1 defines the algorithm to calculate the coordinate position (in pixel units) of a CVL identifier 501, from the beginning to the ending of the inscription.

FIG. 5.2 is an example of a Continuous Vector Line (CVL)

FIG. 5.3 is an example of a CVL Identifier

FIG. 5.4 is an example CVL Profile, which consists of "pre-determined" CVL Identifiers FIG. 6.1 is Communication scheme in the enterprise network between 3 entities: CVL Capture Program, webserver(s) or application server(s), and Biometric Signature Registry Server (BSR Server)

FIG. 6.2 is flow diagram showing Biometric Signature Registry Server working as a web service FIG. 7.1 is a flow diagram showing the return value (RV) from the BSR upon receiving the given UserID & device name & the request from the webserver to query what type of 2nd Factor Authentication and backdoor.

FIG. 7.2 is a flow diagram showing the action, performed by the web server and upon receiving the return value (RV) from the BSR in Step 711 in FIG. 7.1

FIG. 8.1 is a flow diagram of Using a CVL Profile as 2nd Factor Authentication

FIG. 8.2 is a flow diagram of a Point & Click Image (PCI) as 2nd Factor Authentication when initial enrollment and a CVL profile fails as the 2nd Factor Authentication FIG. 8.3 is a flow diagram showing a typical CVL Enrollment with a remote Web Server/Application Server.

FIG. 9.1 is a flow chart for validating a user with 2nd Factor Authentication in the System FIG. 9.2 is a flow diagram of the steps involved in a typical CVL Validation/Verification with a remote Web Server or a remote Application Server.

FIG. 10.1 is a flow chart of the algorithm used to enroll the trial collection of points to create a stored Point and Click (PCI) collection of points.

FIG. 10.2 is a sample screen shot of the computer application to enroll the trial collection of points to create a stored Point and Click (PCI) collection of points.

FIG. 10.3 is an algorithm to calculate the coordinate position (in pixel units) of given clicked points in the PCI image.

FIG. 11.1 is a flow chart of the Algorithm to validate the trial collection of points against the stored PCI collection of points FIG. 11.2 is a sample computer screen shot of the Computer Interface to Verify the trial collection of points against the stored PCI collection of points FIG. 12.1 is a flow chart of the Back door scheme used to reset 2nd Factor Authentication FIG. 13 is an example screen shots of the "push down" technique, which uses only the palm and fingers to move the cursor of the pointing device to inscribe with this defined anatomical technique.

FIG. 14 is an example of the range of motion arc from the palm and fingers as drawn with an input pointing device (mouse)

FIG. 15.1 is an algorithm to describe how an Identity Reputation Score is created using other identity databases FIG. 15.2 is an algorithm for increasing a user reputation score after the user has been confirmed and has a reputation score being at least 1 (as illustrated in FIG. 15.1)

FIG. 16.1 is examples of how the icon and the Reputation Score appears after the confirmation of the identity checking.

FIG. 16.2 is an example of identity reputation of a user that is depicted everywhere a UserID appears in the webserver.

DETAILED DESCRIPTION OF THE INVENTION

FIG. 1 is a flow diagram describing the method for the user to enter the unique identifier to a form in the local computer system. The beginning registration operation executes at a client computer or processing device. The user 100 follows instructions 101 using a physical input method or a contact less input described in 102. After the user inputs their reference code such as a personal identification number (PIN), or password or other secret code 103 in the space provided, using the available input device 102 and the selected Pointing Input Device 104, the user selects Enroll 105 and the input is sent onto a local server 107. If they have already enrolled previously the user selects Validate 106. In either case the unique identifier is sent to local server 107.

FIG. 2 is illustrating the process of "Enrolling a Profile" in a local server. After the user has completed inputting their unique identifier or secret code 103 and selecting Enroll 105 or Validate 106 and the input is sent to the local server 107, they are given instructions on how to create their secret code using a Continuous Vector Line (CVL) 203 and how to use the drop down technique 203. After correct positioning of their wrist and using only their palm and fingers the user selects OK 204 to begin inscribing their first (CVL) (a sample of which is shown in object 205b), on the draw-able area 205 using visible or invisible ink selected in 206. Using the pointing device selected in 104, the user clicks the Next button 209 after each CVL identifier 205 is formed. The inputted CVL identifier 205 is sent to the local server 212 or remote server 210. If the user makes a mistake they select the Clear button 208 to begin again. After each successful input of a CVL identifier 205 is drawn, the enrollment process is aided by sequential numbers that light up 207. If the user 100 draws a CVL 205 that falls outside a pre-determined limit of consistency versus the previous CVL, a message pops up 213 asking them to inscribe again to be more consistent. After the user successfully completes their unique CVL profile three times as shown in FIG. 5.2, their CVL profile is complete and automatically sent in a specific format to a database or registry 212, 210, through a secure communication channel described in FIG. 6.1.

FIG. 3 illustrates the process of "Verifying Against a Profile" with the local server. In FIG. 3, after a user 100 has enrolled previously (see FIG. 2), they will view the site containing instructions 301a, which executes at a user's computer or processing device 300. To begin the user reads the instructions 301a and then enters a reference code 301b such as a personal identification number (PIN), or password or other secret code using any of the available input devices 301c. After their reference code is inputted, the user selects an input device from a drop down list menu 301c, selects Validate 302 and is given instructions how to create their secret code CVL identifier 305 and how to use the push down technique 303. The user selects OK 304 and begins to inscribe their CVL identifier 305b on the draw-able area 305 using visible or invisible ink selected in 306. Using the pointing device selected the user selects the Next button 309 after they have inscribed their CVL identifier 305b. The inputted CVL identifier is then sent to the server or a local running active content 310, 312.

FIG. 4 is a flow diagram describing the process that occurs after the user has selected the NEXT button 309 in FIG. 3, and the input is sent to the local server 312 to be compared to the stored previously created CVL profile (see FIG. 5.4). The server 312 does the consistency analysis for the new submitted CVL identifier 305b at time 2, to the CVL identifier 305b or CVL identifiers 395b in the CVL profile (see FIG. 5.4), which is identified by the reference code 301b, generated at the time 1. The user is then presented with a message 400 or 400a after the CVL 305b has been compared to the stored CVL profile (see FIG. 5.4) and if the new CVL identifier 305b falls within a certain threshold matching method (as described in "Function 1" below) the user selects the OK button 401 and asked for a next action from a drop down menu 402 or is automatically directed to a new site or prompted for a next action 402, or is asked to Validate 106 again by inscribing a more consistent CVL identifier 502. If the user does not successfully Validate 106 after three attempts they are directed to another enrollment method described in FIG. 8.1.

If the user completes a successful Validation 106 their message says congratulations 400 and they are asked to click on the OK button 401, to view the list of next step(s) 402. If message 400 appears the user has the permission to do a next action such as viewing the content of a document, accessing authorized users only sections on the local machine or on the network, or approval of a transaction 402.

Function 1: Computes the matching score between a newly submitted CVL identifier and the CVL profile
Function computeScore (new_CVL_identifier, CVL_profile)
If (CVL_profile only have 1 CVL identifier)
Score=percentage different score between the new submitted CVL identifier at time 2 and the only one CVL identifier recorded in the profile
Else
Score=value, which is calculated based on percentage different score between the new submitted CVL identifier at time 2 and each of the CVL identifier recorded in CVL profile.
End If
Return Score;
End Function FIG. FIG. 5.1 defines the algorithm to calculate the coordinate position (in pixel units) of a CVL identifier 501, from the beginning to the ending of the inscription. As the user inscribes their CVL Identifier 501 from the input or pointing device 104, each clicked point of their CVL identifier 501 is recorded by a coordinate pixel 287.91 beginning with the first clicked point 287.91 to the last clicked point 312.64. The drawable area consists of countless pixel points beginning in the left hand corner as 0,0 510.

FIG. 5.2 provides examples of the data structure of a Continuous Vector Line (CVL), CVL Identifier and a CVL Profile. The CVL #1, #2, #3 consists of a series of points that have a start and a finish 1-4. Any point 1, beyond a single point 2, 3, 4 is considered a continuous line CVL #4, CVL #5, CVL #, CVL #7, CVL#8. In FIG. 5.2 a CVL Identifier represents a finished series of points that make a continuous line to become a completed inscribed object for the user. In FIG. 5.3 the CVL Profile consists of a number of CVL identifiers (in this instance 3 CVL's) that become the profile that is stored in secondary storage 210.

FIG. 6.1 describes the process of the how the communication process works between the CVL Capture program, web server(s) or application servers and the Biometric Signature Registry (BSR server).

FIG. 6.2 describes how the Biometric Signature Registry (BSR) server works. The BSR server may be a separate physical computer system, which includes:
Function & library (in BSR Server Module 622) to verify user's CVL profile (see FIG. 5.4).
The Profile Database 625 (which contains the relations between 3 different schemes)
User's CVL profile (see FIG. 5.4)
Point & Click Image (see FIG. 10.2)
Complex security questions (see FIG. 8.2)
Check against other identity database for validity 628
Backdoor options (see FIG. 12.1), includes two types:
If the user 100 can enroll a CVL profile (see FIG. 5.4), then the Point & Click Image (see FIG. 10.2) will be their backdoor (see FIG. 7.1)
If the user 100 can not enroll a CVL profile (see FIG. 5.4), then the Point & Click Image (see FIG. 10.2) scheme will be their 2nd factor authentication and complex security questions will be their backdoor (see FIG. 7.1).

The BSR 605 works as a web service in a separate physical computer system (as shown in FIG. 6.2), which listens on a TCP port 622 (a TCP port is a special number present in the header of a data packet. TCP Ports are typically used to map data to a particular process running on a computer) for incoming requests 621a originating from the web server 603.

The TCP port number 622 is customized during setting up the BSR 605 into a new physical computer system.

Upon receiving a request 621a from the web server 603, the BSR server 605 performs the following steps:
1. BSR server 605 spawns a worker (thread of process) 624 to handle the request 621a.
2. Passes the data sent from the web server 603 to the newly spawn thread of process 624
3. The BSR server 605 goes back to listen for additional requests.

In case of multiple concurrent requests 621b to the BSR server 605, there is a mechanism 623 in the BSR server 605 to queue all the requests to the BSR server 605 and handle them accordingly within the steps as described above.

The BSR 605 should not interact directly with the end-user 100. All incoming request 621a from the user 100 pass through the web server 603 and the webserver 603 then forward all incoming requests 621a to the BSR 605, See FIG. 6.1.

The BSR 605 processes the incoming requests 621a and then sends the response back to the web server 603. The webserver 603 then determines the user's 100 next actions 402.

FIG. 7.1, FIG. 7.2 are flow charts that describe the process of operation when a user establishes a unique SessionID 803 (Session ID 803 is a unique string, which is first created when the user 100 visit the web server 836. The SessionID 803 is used by the web server to identify user's preferences, or authorization level) with the web server by completing registering their reference ID code 103 which is considered the 1st factor authentication 710. After selecting the Enroll 105 or Validate buttons 106 (see FIG. 1), the web server 603 sends the UserID 103, pointing selected input device 104 and the SessionID 803, as a message to the BSR 605 to query what 2nd factor authentication (see FIG. 1) and back door (see FIG. 7.1) has been previously selected by the user or whether they have selected these variables yet to complete the Enrollment and Validation process.

The Return Values each 701 in FIG. 7.1 & FIG. 7.2 are comprised of the following example schemes:
Note: We use the scheme of a binary number system to describe the status of the second factor authentication (see FIG. 1) & backdoor information (see FIG. 7.1) for a given UserID 103 & Device Type 104 with 5 digits: 11111

☐ XXXX1☐ Right most digit is 1 if the User 100 has completed BioSig-ID as second factor authentication (see FIG. 1)

☐ XXX1X ☐ Second right most digit is 1 if the user 100 has completed PCI (see FIG. 10.2) as the backdoor (see FIG. 7.1)

☐ XX1XX ☐ Middle digit is 1 if the user 100 has completed PCI (see FIG. 10.2) as second factor authentication (see FIG. 1).

☐ X1XXX ☐ Second Left most digit is 1 if the user completed CSQ (see FIG. 8.2) as the backdoor.

☐ 1XXXX ☐ Left most digit is 1 if the user 100 has the same Session ID 803.

Thus here is the possible return of this function:

i. ☐ return 00000 if the user in 100 doesn't have any second factor authentication (see FIG. 1) & backdoor (see FIG. 7.1), different Session ID 803 or no Session ID 803 ii. → return 10000 if the user has incomplete CVL profile (see FIG. 5.4) as second factor authentication (see FIG. 1) & no backdoor (see FIG. 7.1) And same SessionID 803 iii. ☐ return 00001 if the user has completed CVL profile (see FIG. 5.4) as second factor authentication (see FIG. 1), but no backdoor (see FIG. 7.1) & different Session ID 803.

iv. ☐ return 00001 if the user has completed CVL profile (see FIG. 5.4) as second factor authentication (see FIG. 1), incomplete PCI (see FIG. 5.4) as the backdoor (see FIG. 7.1) & different SessionID 803 v. ☐ return 10011 if the user has completed CVL profile (see FIG. 5.4) as second factor authentication (see FIG. 1), completed PCI (see FIG. 10.2) as the backdoor (see FIG. 7.1) & same Session ID 803

FIG. 8.1 is a flow diagram that illustrates the operational process of how the CVL profile (see FIG. 5.4) is used as a second factor authentication (see FIG. 1) and the steps required to enroll the CVL profile (see FIG. 5.4) using a CVL Capture Program (CCP) 313 involving a downloaded program like ActiveX 601 or a program that requires no download like Flash 601. After the CCP 313 captures the CVL identifier 311, the type of action like Enroll, the input pointing device 104 used and the SessionID 803, the information is sent to the BSR server 605 if its in a valid format or back to the CCP 313 which prompts the user 100 for another CVL identifier 311. The BSR 605 establishes whether the user has an existing CVL profile (see FIG. 5.4) and if YES, it sends the response back to the server stating that the user already has a complete profile and they need to Validate instead of New enroll. If the BSR 605 establishes that the user 100 does not have an existing CVL profile 625, the BSR 605 sends back the response to the web server 603 that the CVL profile 625 is complete and will prompt the user to inscribe more CVL's 305*b* and once completed successfully then follow the process as described. The BSR server 605 will check whether the back door (see FIG. 7.1) has been completed for that unique user 100 and if not sends a message to the server to prompt the user to create a Point and Click Image (PCI) as their backdoor. Time outs for the session are also described.

FIG. 8.2 is a flow diagram of a Point & Click Image (PCI) (see FIG. 10.2) as 2nd Factor Authentication (see FIG. 1) when initial enrollment and a CVL profile (see FIG. 5.4) fails as the $2^{nd}$ Factor Authentication (see FIG. 1). If the user 100 fails after a pre-specified number of attempts to either Enroll 105 or Validate 106, the web server 603 will prompt the user 100 to choose a Point and Click Image (PCI) (see FIG. 10.2) as the replacement 2nd factor authentication (see FIG. 1). If the user 100 successfully completes the PCI (see FIG. 10.2) they are finished with the enrollment and the BSR 605 stores their CVL profile (see FIG. 5.4) and their (PCI) data (see FIG. 10.2). If the user 100 fails three attempts to Enroll 105 or Validate 106, the BSR 605 sends a message to the web server 603 to prompt the user 100 to create Complex Security Questions (see FIG. 8.2) as their backdoor (see FIG. 7.1). Once completed, the user 100 is finished this phase of enrollment.

FIG. 8.3 is a flow diagram showing a typical CVL Enrollment with a remote Application Server 603. After the user 100 has completed inputting their unique identifier or secret code 103 and selecting Enroll 105 similar to FIG. 2, the input containing the specific action—Enroll 105, the UserID 103, input pointing device 104 and other information 803 is sent through a secure communication channel 602 through the Internet/Intranet 602 to the web server 603 or the application server 603 and the web server or the application server 603 forwarded to the BSR 605. If the user profile is not found in the BSR 605, the user 100 is prompted to begin enrolling their CVL profile (see FIG. 5.4) through the enrollment process described in Steps 5 and 6 and similar to the process described in FIG. 2.

After the user 100 successfully completes their unique CVL profile (see FIG. 5.4) three times as shown in FIG. 5.2, their CVL profile and 310 is complete and automatically sent in a specific format to a database or registry 212, 210, through a secure communication channel 602.

FIG. 9.1 is a flow chart describing the process for validating a user with 2nd factor authentication (see FIG. 1). The user 100 validates the first factor authentication by entering their reference ID 103. The user 100 clicks on the Validate button 106. The webserver 603 receives the response message back from the BSR (as described in the method in FIG. 7.1) and based on the returned value (RV), the BSR determines what kind of second factor authentication the user has. If the user has not previously enrolled with a second factor authentication (see FIG. 1), they are prompted to step 801 in FIG. 8.1.

If the user 100 has CVL profile as the second factor authentication, then they follow the step outlined in 911. If the user 100 has PCI profile as the second factor authentication, then they follow the step outlined in 921.

FIG. 9.2 is a flow diagram of the steps involved in a typical CVL Validation with a remote Application Server 603. After a user 100 has enrolled previously (see FIG. 2), they will view the site containing instructions 301 which executes at a user's computer 100A or processing device. The user 100 reads the instructions 101 and then enters a reference code 103 such as a personal identification number (PIN), or password or other secret code using any of the available input devices 102. After their reference code 103 is inputted, the user 100 selects an input device 104 from a drop down list menu 104, selects Validate 106 and is given instructions 303 how to create their secret code CVL identifier 311 and how to use the push down technique 303. The user selects OK 304 and begins to inscribe their CVL identifier 311 on the draw-able area 305 using visible or invisible ink selected in 306. Using the pointing device 104 selected the user selects the Next button 309 after they have inscribed their CVL identifier 311 one time and automatically sent in a specific format to a database or registry 927*a*, through a secure communication channel described in FIG. 6.1. If the user is unable to validate their CVL identifier 311 to a CVL profile (see FIG. 5.4) after three attempts, the user is prompted to use their backdoor described in FIG. 12.

FIG. 10.1 is a flow chart of the algorithm used to enroll the trial collection of points to create a stored Point and Click Image (PCI) profile. The user 100 starts the enrollment process with PCI when the BSR sends the list of images to the webserver, which is then forwarded to the user. The user 100 chooses one of the images 1010, the ID of the image is sent to the webserver 603, which is then forwarded to the BSR 605. The BSR 605 sends the original image back to the webserver. The webserver then forwards the image and the PCI Flash application (see FIG. 10.2 & FIG. 11.2) to the user system 100A. On the PCI Flash application, the user 100 clicks on the center of predetermined number of objects. The Flash application records in order the coordinates of those clicked points from the user 100. The user clicks the Submit button to send these points to the webserver. The webserver then forwards it to the BSR. If the attempt is valid by the user, the BSR records the collection of points in the database and states the CVL profile is complete and sends this message back to the webserver. If the attempt is not valid, the user 100 is asked to click more points on the original image again. After the predetermined number of attempts has been reached, the user 100 is redirected to contact the administrator.

FIG. 10.2 is a sample screen shot of the computer application to enroll the trial collection of points to create a stored Point and Click Image (PCI) collection of points 625b. To create a point 1021, 1022, 1023, the user 100 clicks on the image to leave a colored point 1021, 1022, 1023 at a place of their choosing. They have the options of choosing up to 7 points. In this image, three points (1021, 1022, 1023) have been selected as the points to be captured to represent the stored profile of the user. The user 100 selects these same points three times and clicks the submit button after each attempt. In step 2 and step 3, for each clicked points, the user 100 can be within a certain radius distance from the original point chosen in step 1. In step 2 and step 3, if the user 100 clicks outside of the radius distance from the original points, the user 100 will be asked to submit another set of points. After successful attempts, the number on 1024 will light up and enlarge to show the user their current step. After 3 successful attempts, the user 100 is sent a message 1012 indicating they have successfully enrolled a PCI profile 625b.

FIG. 10.3 defines the algorithm to calculate the coordinate position (in pixel unit) of given clicked points in the PCI image. The user 100 clicks on the center of a predetermined number of objects designated by the red dots in FIG. 10.3 with their input or pointing device 104. The three points (305,123, 287,91,312,64) have been selected by the user 100, as the points to be captured by the Flash application (see FIG. 10.2 & FIG. 11.2) and recorded by their pixel coordinates –305, 123, 287,91, 312,64.

FIG. 11.1 is a flow chart of the Algorithm to validate the trial collection of points (1121, 1122, 1123) against the stored Point and Click (PCI) collection of points 625b. The user 100 selects an image 1110 from the image list 1110. The user 100 is then instructed to enter their sequence of points on an image that appears in a distorted version as shown in FIG. 11.2. This distorted image (see FIG. 11.2) is scaled down 90%-50% from the original image (see FIG. 10.2) and is rotated randomly and is transformed to represent a new image (see FIG. 11.2). The user 100 should click on the points (1121, 1122, 1123), they had previously selected in order and if the clicked points fall within an acceptable region of the original 1118, points (1021, 1022, 1023) and the order is correct, the BSR 605 then sends a message back to the web server 603 that this PCI validation attempt is valid and the user 100 may proceed to the next action 402.

FIG. 11.2 is a sample screen shot of a computer application validating a stored PCI profile 625b. The image shown on FIG. 11.2 is distorted and scaled down 90%-50% from the original image (see FIG. 10.2) and is rotated randomly and is transformed to represent a new image (see FIG. 11.2). The user 100 is asked to click in order the points on the center of at least 3 objects that were selected previously during the enrollment phase (see FIG. 10.1). If the user 100 has selected the wrong image or clicked the wrong set of points, or the wrong order of points a pre-determined number of times, they are asked to call the administrator 1119.

FIG. 12 is a flow chart of the Back door scheme used to reset second factor authentication (see FIG. 1). The user 100 is asked to establish a unique SessionID 803 and submits their UserID 710 and password 710 to the webserver 603. If this is a valid User ID 710 and password 710 the user 100 is automatically directed to backdoor either with the PCI in step 1208 or Complex Security Questions in step 1204. If the user 100 was not enrolled in a backdoor (either 626a or 626b) for that given device 711, the webserver 603 sends back the message to the user 100 "No backdoor was found in the database for the given UserID 711". If the user 100 has previously enrolled the backdoor (either 626a or 626b) for that given device 711, they would follow the step outlined in 1204 & 1208. The user 100 is prompted to complete step outlined in 1204 or 1208 respectively, and if the user 100 is unable to complete either the step 1204 or 1208 after 3 attempts, they are requested to call the administrator 1210.

FIG. 13.1 shows an example of the push down technique 203, which uses the palm and fingers to move a pointing device to inscribe a CVL identifier (see FIG. 5.3) using this defined anatomical technique 203. An example of the writing surface and the position of the wrist and range of motion arc from the palm and fingers is illustrated (see FIG. 13.1).

FIG. 14 shows examples of the range of motion arc from the palm and fingers drawn with an input pointing device (in this instance a mouse). FIG. 14.1a, 14.2a, and 14.3a illustrate how the user 100 draws lines indicated by the cursor (in this instance an arrow) that corresponds with the mouse movement illustrated in 14.1b, 14.2b, and 14.3b.

FIG. 15.1 is the algorithm to describe how an Identity Reputation Score is created using other identity databases. After the user 100 completes the enrollment process 1511 and creates the user account, they may choose to verify their identity with other identity databases 1512. The other identity databases will confirm identity through at least one of background checking, phone call, or knowledge based questions 1513. The user 100 is first identified as a valid, legal person according to pre-determined criteria 1514. If the user is confirmed as a valid, legal person, their reputation score is assigned with a value of 1 1515 and the user 100 becomes confirmed 1516. If the user does not choose to validate their identity with other identity databases, a reputation score of 0 is assigned to the user 1517.

FIG. 15.2 is the algorithm for increasing a user reputation score after the user has been confirmed and has a reputation score being at least 1 (as illustrated in FIG. 15.1). After the UserA completes account registration 1521a, they can confirm that they know UserB 1521b as a valid, legal person by clicking on a link 1522. After clicking on the link, the webserver confirms that UserB 1523a and UserA 1524a both have a reputation score of 1 or more. If not, the respective user 1521a or 1521b is sent an error message requesting further action 1523b, 1524b. If both users have the reputation score 1 or greater, the next step involves checking whether UserA 1521a, has confirmed UserB 1521b previously. If UserA 1521a has confirmed UserB 1521b previously, an error message is sent stating: "You can not give Reputation Score to the same user twice" 1525b. If this is the first time UserA 1521a is confirming UserB 1521b, the webserver 1526 automatically accepts the confirmation and adds UserA 1521a to the list of people who confirmed UserB 1526. The webserver then increments the Reputation Score of UserB 1521*b* by 1, 1527.

FIG. 16.1 is examples of how the icon and the Reputation Score appears after the confirmation of the identity checking. After the user's Reputation Score is confirmed 1527, the UserID or nickname 1601 is assigned a Reputation Score 1602 that follows with an icon (in this instance is a star 1603*a*, 1603*b*). If the reputation Score is less than a pre-determined number (in this instance 50) 1603*a*, the color of the icon is different than the pre-determined number (in this instance greater than 50) 1603*b*.

FIG. 16.2 is sample of a Reputation Score 1622 of a user 100 and the icon 1623 that is attached along with the UserID or nickname 1621 in the webpage 1620. After the user has a Reputation Score, this score is added to their UserID or nickname 1621 in every instance of displaying UserID or nickname in a webpage.

What is claimed is:

1. A method of comparing two continuous vector lines (CVL) including collected data points generated by a user using a computer pointing device consisting of at least one of a mouse, stylus, touchpad, eraser stick, trackball, joystick, digitizer tablet pen or any physical input consisting of at least a finger or input from a body movement, or input from electrical current or impulses, or input from human or mechanical sound waves and comprised of the following steps:
 A. enrolling a profile is comprising of the following steps:
  i. displaying an instruction asking the user to:
   a) the pointing device consisting of at least a computer keyboard, a finger, a soft keypad, or any other input from body movements or input from electrical current or impulses, or input from human or mechanical sound waves, or through a token consisting of at least a credit card, a USB token, which can be carried around by user and which is capable of sending a unique identifier or a reference code consisting of at least a personal identification number (PIN), or a password or a secret code to a physical machine by making a contact or contact less;
   b) choose a name of the pointing input device, which is capable of capturing the continuous vector line (CVL) identifier from a radio button list or drop down list;
  submitting the information in step A.i.a. and A.i.b. by clicking on a "enroll" submit button, which sends the input into a server, or local running active content;
  iii. grasping the pointing device by the user, which was selected in step A.i.b above, and positioning a wrist of the user to be pivoted for moving the pointing input device on at least one of the table, writing surface or on a mouse pad using a push down technique so the wrist remains stationary on the writing area surface;
  iv. using the pointing input device that was selected in step A.i.b. above, the user then completes inscribing said CVL identifier, which is comprising of 1 or more (CVL's), according to criteria and instructions provided, moving the pointing input device using the push down technique according to the instructions provided so the wrist remains stationary and only the palm and fingers of the user move the cursor on a draw-able area shown on a displayed screen of a collecting device of the user;
  v. submitting a completed CVL identifier to the server, or a local running active content by clicking on a next button and repeating this process of creating the CVL identifier a predetermined number of times to create a user's CVL profile stored in the server, or a local running active content;
  vi. viewing the CVL identifier on the displayed screen of the collecting device by the user, or electing to use invisible ink, which does not display the CVL identifier on the screen of the collecting device, or using a combination of visible and invisible ink;
  vii. storing the CVL profile in an encrypted or unencrypted form in at least one of the computer registry, or memory, or database, or any computer storage device generating subsequent CVL identifiers by the same user using any computer pointing device are also stored in the computer registry, or memory, or database, or any digital storage device to enable the comparison of the CVL identifier generated at time 2, to the CVL identifier in the CVL profile generated and recorded at a first time;
  viii. asking the user, during the enrollment, if the user enters an inconsistent CVL identifier according to pre-determined specifications, to re-inscribe and submit a consistent CVL identifier to the server, or local running active content;
  ix. directing the user to another approach to enroll if the user is unable to submit a consistent CVL identifier after a pre-determined number of attempts Viii;
 B. verifying against a profile comprises the following steps:
  i. displaying an instruction asking the user to:
   a) use any available input device including a computer keyboard, finger, soft keypad, or any other input from body movements or input from electrical current or impulses, or input from human or mechanical sound waves, or through a token including a credit card, USB token, which can be carried around by user, which is capable of sending a identifier or reference code including a personal identification number (PIN), or password or other secret code to the physical machine by making a contact or contact less;
   b) choosing a name of the pointing input device, which is capable of capturing the continuous vector line (CVL) identifier including the mouse, stylus, finger, touch pad, joystick, or other advanced pointing input device from a radio button list or a drop down list;
  ii. submitting the information by the user in step B.i.a. and B.i.b. by clicking on the validate submit button, which sends the input into a server, or local running active content;
  iii. giving the user instructions to grasp the pointing device, which was selected in step B.i.b above, and position said wrist (to be the pivot for moving the pointing input device) on the table, writing surface or on the mouse pad using the push down technique so the wrist remains stationary on the writing area surface;
  iv. using the pointing input device that was selected in step B.i.b. above, the user completes inscribing the CVL identifier, which includes 1 or more (CVL's), based upon a criteria and instructions provided and moving the pointing input device using the push down technique according to the instructions provided so the wrist remains stationary so that the palm and fingers move the cursor on a draw-able area shown on the displayed screen of the user's collecting device;

v. submitting the completed CVL identifier to the server, or a local running active content by clicking on the "next button";

vi. viewing the CVL identifier on the displayed screen of the collecting device, or using invisible ink which does not display the CVL identifier on the screen of the collecting device, or using the combination of visible and invisible ink;

providing consistency analysis for the new submitted CVL identifier at a second time, to the CVL identifier or CVL identifiers in the CVL profile, which is identified by the reference code, generated at the first time.

2. The method of claim 1 wherein said server includes at least one running active contents or programs, which reside on a local or remote computer system, the remote computer system including at least one computer, the main active content running on the local or remote server adapted to create a worker process or active content to handle each incoming request and the main active content running on the local or remote server adapted to listen for a new incoming request.

3. The method of claim 1 wherein said step of both enrolling and verifying includes collecting an ordered series of data points, to form the CVL from the input device or the pointing device refers to a line generated by at least two points.

4. The method of claim 1 wherein said data point includes x, y coordinates, and pressure and time collected at that point, wherein the time collected includes real time recorded in the computer system and/or relative time compared to the recorded time of the first data point collected.

5. The method of claim 1 wherein said push down technique includes the step of the user creating input from the pointing input device using a defined anatomical technique that limits the range of wrist and arm motion, thereby creating measurable limits in a users ability to physically move the pointing input device and wherein the user stations the user's wrist and is limited to only using palm and fingers of the user to move the cursor of the pointing device to inscribe, this defined anatomical technique will reveal biometric parameters like hand size and maximum finger motility unique to the user in a repeatable, reproducible fashion to help confirm the matching of two continuous lines.

6. The method of claim 1 wherein said both enrolling and verifying step includes a purpose that is defined as what future action is expected including personal account access, approval of a transaction, authentication of identity.

7. The method of claim 1 wherein said transmitted information in the CVL identifier to the server further includes information about the identity of the device including a generated global unique ID (GUID), device information including at least one of a media access control MAC address, or CPU ID, network information including Internet protocol address, and information about any installed software, wherein the information is collected by the active content including a library program running in the computer system or an add-on to an Internet browser running in the computer system.

8. The method of claim 1 wherein said CVL profile includes information about the identity or personal information and behaviors about the user including a first name, a last name, a home address, a social security number, and a time of use.

9. The method of claim 1 wherein said draw-able area, which allows the user to inscribe on, is further divided into a pre-determined number of sections and wherein the behavioral information includes the predetermined number of sections indicating where the user begins and ends each individual CVL drawing and a pattern of each individual CVL.

10. The method of claim 1 wherein said CVL profile is adapted to be stored in a digital storage device including a credit card or a USB token or a chip adapted to be implanted in the user.

11. The method of claim 1 where said information which is transmitted between the local system and the local sever, or the remote server, stored, or loaded in the same local machine, or memory, or external storage device is adapted to be encrypted by using symmetric cryptographic algorithms including data encryption standard DES, advanced encryption standard AES or public key infrastructure (PKI) cryptography including secure sockets layer SSL, rivest, shamir and adleman RSA, digital signature algorithm DSA, elliptic curve cryptography.

12. The method of claim 1 wherein said step of collecting data points that form a continuous line at the first time are mapped according to a pre-defined one-way conversion method at a second time for storage and/or further comparison of two CVLs.

13. The method of claim 12 wherein said pre-defined one-way conversion method is using quadrant analysis according to the pseudo-code:

```
for i=0 to N-1
    xVal=x[i+1]-x[i]
    yVal=y[i+1]-y[i]
    QARRAY[i]=QUAD_1
    if (xVal>0 && yVal>0)
        then QARRAY[i]=QUAD_1;
    else if (xVal<0 && yVal>0)
        then QARRAY[i]=QUAD_2;
    else if (xVal<0 && yVal<0)
        then QARRAY[i]=QUAD_3;
    else if (xVal>0 && yVal<0)
        then QARRAY[i]=QUAD_4;
    else if (xVal>0 && yVal=0)
        then QARRAY[i]=QUAD_5;
    else if (xVal<0 && yVal==0)
        then QARRAY[i]=QUAD_6;
    else if (xVal==0 && yVal>0)
        then QARRAY[i]=QUAD_7;
    else
        then QARRAY[i]=QUADRANT_8;
end for
``` where
- → x[i] and y[i] over the range i=0 to i=N−1 is the discrete representation of a line,
- → QARRAY[i] over the range i=0 to i=N−2 is the quadrant array,
- → QUAD_1, QUAD_2, QUAD_3, QUAD_4, QUAD_5, QUAD_6, QUAD_7, and QUAD_8 are integers,
- → xVal and yVal are integers, and N is the number of points.

14. The method of claim 1 wherein said consistency analysis of the new submitted CVL identifier against the CVL identifier or CVL identifiers stored in the CVL profile is analyzed at the remote server or the local running active content by tabulating a score which records the difference including percentage difference between a submitted CVL identifier at the second time (time 2) and the CVL identifier or CVL identifiers stored in the CVL profile, recorded at the first time (time 1), wherein the score is transmitted to one of the end user, other designated party, computer active content or a program either locally or remotely using wired or wireless medium including the internet secure file transfer protocol (SFTP) server, voice over internet, internet protocol television, satellite dish networks, cellular network or other communication connections, individually or in unison through secure or insecure transmission and wherein the score of consistency analysis received at the end user or other designated party either locally or remotely is adapted to be used to determine a privilege of the user to proceed and to allow the user to the next action or the next step consisting at least one of viewing the content of a document, launch of an application on the local or remote computer system, downloading computer application or computer data, accessing authorized users only sections on the local machine or on the network, re-directing to another site or file or folder, or approval of a transaction.

15. The method of claim 14 wherein said step of determining the percentage difference score between a new submitted CVL identifier at a second time and a CVL identifier or CVL identifiers recorded in the CVL profile at a first time is determined according to the following pseudo-code:

```
function computescore (new_CVL_identifier, CVL_profile)
    (CVL_profile only have 1 CVL identifier)
        Score=percentage different score between the new submitted CVL identifier at time 2 and the only one CVL identifier recorded in the profile
    else
        score=value, which is calculated based on percentage different score between the new submitted CVL identifier at time 2 and each of the CVL identifier recorded in CVL profile.
    end if
    return score;
end function.
```

16. The method of claim 15, wherein said step of determining the percentage difference score between the submitted CVL identifier at the second time and the CVL identifier recorded at the first time is further determined according to the following pseudo-code:

```
Function computeScore(new_CVL_identifier, CVL_identifier)
    score=0;
    If (new_CVL_identifier.numCVL "not equal" CVL_identifier.numCVL) {
        Return 0;
    }
    Else {
        N=CVL_identifier.numCVL;
        For i=0 to N-1 {
            score=score+
                PercentageDifferenceCVLs(new_CVL_identifier.CVL[i],
                CVL_identifier.CVL[i])
        }
        score=score/N;
    }// End if
    return score;
End Function
```
Where
→ new_CVL_identifier.numCVL is number of CVL in the new submitted CVL identifier recorded at the second time
→ CVL_identifier.numCVL is the number of CVL in the "compared to" CVL identifier recorded at the first time
→ new_CVL_identifier.CVL[i] over the range i=0 to i=N−1 is array of CVL in the new CVL identifier
→ CVL_identifier.CVL[i] over the range i=0 to i=N−1 is array of CVL in the "compared to" CVL identifier
→ score is real number, used to compute the percentage different score for two CVL identifiers → percentage difference CVLs is the function to calculate the percentage different score between two CVLs.

17. The method of claim 14 wherein said step of determining the percentage difference score between the two CVLs in the function percentagedifference CVLs is further tabulated at least one of:
➢ quadrant arrays conversion from the CVLs' one-way transformation
➢ angle analysis formed by 3 consecutive points from the CVL
➢ information about the length of the CVL
➢ information about the number of points recorded for the CVL
➢ information about the vertical height of the CVL
➢ information about the horizontal width of the CVL
➢ information about the time recorded when the CVL was finished
➢ information about the average speed when inscripting the CVL
➢ information about the time stamped in each of the data points
➢ information about pressure information recorded in each of the data point.

18. The method of claim 15 wherein said step of determining the percentage difference score between the submitted CVL identifier at the second time and multiple CVL identifiers recorded in CVL profile is further determined using an average percentage different score between the submitted CVL identifier at the second time and each CVL identifiers recorded in the CVL profile at the first time by using the following pseudo-code:

```
function computeaveragescore
    (new_CVL_identifier, CVL_profile)
    score=0;
    N=CVL_profile.num CVL_identifier;
    If (N=0) {
        return 1; //100% match
    }
    else {
        for i=0 to N-1 {
            score=score+computescore (new_CVL_identifier,
                CVL_profile.CVL_identifiers[i]);
        }
        score=score/N;
    }
    return score;
end function
```
where
→ CVL_profile is the CVL profile recorded at the first time
→ new_CVL_identifier is the CVL identifier recorded at the second time
→ CVL_profile.num CVL_identifier is the number of CVL identifiers in CVL Profile recorded at the first time
→ CVL_profile.CVL identifiers[i] over the range i=0 to i=N−1 is array of CVL identifier in the CVL profile recorded at the first time
→ score is real number, used to compute the percentage different score for two CVL identifiers
→ computerscore is the function to calculate the percentage different score between a new submitted CVL identifier at the second time against the CVL identifier(s) in the CVL profile recorded at the first time.

19. The method of claim 1 wherein the step of verify against a profile includes after successfully verifying the trial CVL identifier created at the second time compared against the CVL profile created at the first time, the local running active content or the server includes being adapted to replace in accordance with a pre-determined replacement strategy the CVL identifier in the CVL profile recorded at the first time with the CVL identifier at the second time, wherein the pre-determined replacement algorithm may be one of a random replacement strategy or an oldest first replacement strategy.

20. The method of claim 1 wherein said CVL identifier includes at least one CVL and at least one CVL includes at least two data points.

21. The method claim 1 wherein said user is directed to another enrollment protocol involving the use of identifiers that can include at least one of a background question, an one time password, a phone call, an e-mail, a device identifier, a random number generator, a selection of a figure, a selection of a phrase, an electrical current analysis, a selection of a figure, a selection of a phrase that require an action including point and click.

22. The method claim 21 wherein the action of point and click includes a human cognitive pattern recognition comprised of:
in the enrollment process, selecting a static picture image by the user from a list or upload their own picture image and selecting a plurality of points on the image using the input device and submitting the selected points to the server.
scaling the image down to a range of substantially 90%-50% of original size, transforming the image into one of a random rectangle, a square or a trapezoid and rotating randomly the image when the user attempts to identify themselves through verification against a profile;
the position of the image and the corresponding points that were selected in the original enrollment process is changed each time verification occurs, and the user must select the same point's location within an acceptable region of the original point using a cognitive pattern recognition.

23. The method of claim 1 wherein said step of capturing the CVL identifier includes the step of loading or downloading by the user an active content including a library, or a program, or an add-on to the Internet browser such as ActiveX to their capture device including the computer or PDA, phone or a device having at least a processor and memory storage, wherein the loaded or downloaded active content is adapted to be digitally signed with a code signing certificate and is adapted to be configured automatically to enable the capture of data points generated by a mouse or any other input device.

24. The method of claim 23, wherein the active content is adapted to perform at least one of to download, purchase, renew or save into the local computer or detect newer versions and includes prompts to download or install at least one of the updated content, the digital certificate including the secure sockets layer SSL certificate, digital ID certificate issued by the server, or any $3^{rd}$ party certificate authority.

25. The method of claim 23, wherein said loaded or downloaded active content is adapted to be implemented in computer language which is adapted to be compiled into at least one of computer language code, object code, or is that implemented in high level computer language or scripting language in which the programming code is adapted to be interpreted including at least one of JavaScript, PHP, Perl, VBScript language.

26. The method of claim 1 wherein said comparison of the CVL identifier collected at the second time and in accordance with the CVL identifier recorded on the CVL profile at the first time is analyzed to distinguish between different methods of inscribing including scribbling, cursive, personal handwriting signature, letter, number, or shapes and wherein the analysis of CVL identifiers which distinguish the method of inscribing human signature includes a CVL identifier including a first CVL which will be long in accordance with a predetermined length, up and down, inscribing left to right or right to left and adapted to intersect itself and a second CVL includes a straight and un-intersect line.

27. The method of claim 1 wherein said data packet being received at the local or remote server, is adapted to create an audit or even trail log that includes pre-programmed data elements including one of an user ID, a session ID, a device name, an internet protocol address, a time and a date stamp, behavioral information of the user, and a request message.

28. The method of claim 1 wherein the method further includes the step of storing said CVL profile created during the step of enroll a profile in a local computer system to enable the step of verify against a profile in response to the local computer system being disconnected from the network and using the local active content to verify the trial CVL identifier at the second time in accordance with locally stored CVL profile, and maintaining a audit trail log in the local system and wherein, responsive to the local computer system connecting to the network, sending the audit trail log of the user by the local active content to the remote server.

29. The method of claim 14 wherein one of said downloaded computer application or computer data includes active content including one of an application program, configuration file, or application data, wherein the application program is adapted to be downloaded and installed one time or as needed by the local machine of the user, wherein the configuration and data files for the active content are adapted to reside on the server, in response to receiving any changes in the configuration file or the data file in the locally running application program, the changes are automatically sent to the server to update the central data and configuration files.

30. The method in claim 14 wherein said step of allowing the user to proceed to the next action or the next step includes the step of a time-out phase including a pre-determined time allowance for the user to access to the computer, the network or for running an application on local or remote computer system, and in response to the time-out expiring, the user is prompted to login again by inscribing a new CVL identifier.

31. The method in claim 1 wherein said step of comparing two continuous vector lines (CVL) from the user includes an alternative enrollment method including a backdoor method, wherein the backdoor method can be used to reset a $2^{nd}$ factor authorization method with the CVL profile, the backdoor method includes at least one of a background question, a one time password, a phone call, an e-mail, a device identifier, a random number generator, a selection of figures, a selection of phrases, an electrical current analysis, a selection of figures or a selection of phrases that require a action including point and click.

32. The method in claim 1 wherein said unique identifier or reference code includes a reference id including one of a user name or additional password to form a first factor authentication ($1^{st}$ FA) being known to the user and wherein the first factor authentication authorizes the login of the user through a webserver or application server, wherein in response to a successful login using the first factor authentication, the user inputs a second factor authentication includes one of the CVL profile point and click image (PCI) profile or other profile, wherein the second factor authentication input is sent to and stored in a separate server including a biometric signature registry (BSR) to perform the verification analysis and tracking step.

33. The method of claim 8 wherein said information stored in the CVL profile or profile for other enrollment protocols is adapted to check against other identity databases for validity, wherein the step of checking the validity of information stored in the CVL profile or profile for other enrollment protocols includes at least one of background checking and making a direct telephone call to the phone number, which was specified during the step of enrolling a profile, wherein in response to the step of completing the background or valid phone number, the status of the user is then changed to a confirmed user and a confirmation number is associated with the user and includes an icon which represents the number of validity checks for that user, wherein the combination of the confirmation number and icon is an identity reputation, wherein in response to the user completing one of the background check and/or valid phone number, the value of confirmation number is adapted to be increased by other confirmed users.

* * * * *